US012701309B2

(12) United States Patent
Matsushita et al.

(10) Patent No.: US 12,701,309 B2
(45) Date of Patent: Aug. 4, 2026

(54) IMAGING ELEMENT UNIT, SHAKE CORRECTION DEVICE, AND IMAGING APPARATUS

(71) Applicant: FUJIFILM Corporation, Tokyo (JP)

(72) Inventors: Shuhei Matsushita, Saitama (JP); Yuta Abe, Saitama (JP); Kouhei Awazu, Saitama (JP); Atsushi Matsushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 18/586,589

(22) Filed: Feb. 26, 2024

(65) Prior Publication Data

US 2024/0292104 A1 Aug. 29, 2024

(30) Foreign Application Priority Data

Feb. 28, 2023 (JP) ................................. 2023-030447

(51) Int. Cl.
| | |
|---|---|
| *H04N 23/52* | (2023.01) |
| *G02B 27/00* | (2006.01) |
| *H04N 23/50* | (2023.01) |
| *H04N 23/54* | (2023.01) |
| *H04N 23/55* | (2023.01) |
| *H04N 23/68* | (2023.01) |

(52) U.S. Cl.
CPC ......... *H04N 23/52* (2023.01); *G02B 27/0006* (2013.01); *H04N 23/50* (2023.01); *H04N 23/54* (2023.01); *H04N 23/55* (2023.01); *H04N 23/687* (2023.01)

(58) Field of Classification Search
None
See application file for complete search history.

(56) References Cited

U.S. PATENT DOCUMENTS

| | | | | |
|---|---|---|---|---|
| 2003/0202114 A1* | 10/2003 | Takizawa | ............... | H04N 23/55 |
| | | | | 348/335 |
| 2003/0214588 A1* | 11/2003 | Takizawa | ............... | H04N 23/52 |
| | | | | 348/207.99 |
| 2007/0153385 A1* | 7/2007 | Sakai | .................... | G02B 1/118 |
| | | | | 359/511 |

(Continued)

FOREIGN PATENT DOCUMENTS

| | | |
|---|---|---|
| JP | 2007135198 | 5/2007 |
| JP | 2013187832 | 9/2013 |

*Primary Examiner* — Paul M Berardesca
(74) *Attorney, Agent, or Firm* — JCIPRNET

(57) ABSTRACT

An imaging element unit according to an aspect of the present invention includes an imaging element; an optical member that is disposed on an imaging surface side of the imaging element; and a vibration applying device that is disposed on a first surface of the optical member, in which a second surface of the optical member opposite to the first surface has a first region including a region overlapping with the vibration applying device in a case of being seen through in an optical axis direction of the imaging element, and a second region that is a region other than the first region, and the first region and the second region have different surface characteristics. In the imaging element unit of such an aspect, it is preferable that the vibration applying device is fixed to the first surface by utilizing a difference in the surface characteristic.

18 Claims, 20 Drawing Sheets

(56)                    References Cited

U.S. PATENT DOCUMENTS

| | | | | |
|---|---|---|---|---|
| 2009/0009857 A1* | 1/2009 | Yamada | ................. | H04N 23/55 |
| | | | | 359/507 |
| 2009/0257123 A1* | 10/2009 | Okazaki | ................. | G03B 17/00 |
| | | | | 359/507 |
| 2011/0005030 A1* | 1/2011 | Shirono | ................. | H04N 23/52 |
| | | | | 15/363 |
| 2013/0235458 A1 | 9/2013 | Kawai | | |
| 2014/0218588 A1* | 8/2014 | Ifuku | ................... | H04N 23/811 |
| | | | | 348/340 |

* cited by examiner

FIG. 12

TO IMAGE INPUT CONTROLLER

CONTROLLER

IMAGING ELEMENT UNIT, SHAKE CORRECTION DEVICE, AND IMAGING APPARATUS

CROSS-REFERENCE TO RELATED APPLICATION

The present application claims priority under 35 U.S.C § 119(a) to Japanese Patent Application No. 2023-030447 filed on Feb. 28, 2023, which is hereby expressly incorporated by reference, in its entirety, into the present application.

BACKGROUND OF THE INVENTION

1. Field of the Invention

The present invention relates to an imaging element unit, and a shake correction device and an imaging apparatus that comprise the imaging element unit.

2. Description of the Related Art

Regarding a technology for performing shake correction of an imaging apparatus, for example, JP2007-135198A and JP2013-187832A disclose a camera shake correction mechanism comprising a fixed unit, a movable unit, a yoke, a coil, and the like.

SUMMARY OF THE INVENTION

An embodiment according to a technology of the present disclosure provides an imaging element unit comprising an imaging element, a shake correction device that moves a movable unit to correct a shake, and an imaging apparatus comprising the imaging element unit.

An imaging element unit according to a first aspect of the present invention comprises an imaging element; an optical member that is disposed on an imaging surface side of the imaging element; and a vibration applying device that is disposed on a first surface of the optical member, in which a second surface of the optical member opposite to the first surface has a first region including a region overlapping with the vibration applying device in a case of being seen through in an optical axis direction of the imaging element, and a second region that is a region other than the first region, and the first region and the second region have different surface characteristics.

According to a second aspect of the present invention, in the imaging element unit according to the first aspect, the vibration applying device is fixed to the first surface by utilizing a difference in the surface characteristic.

According to a third aspect, in the imaging element unit according to the first or second aspect, the vibration applying device is fixed to the first surface by irradiating an ultraviolet curable adhesive applied between the first surface and the vibration applying device with ultraviolet rays through the first region.

According to a fourth aspect, in the imaging element unit according to any one of the first to third aspects, the surface characteristic is a cutting rate of ultraviolet rays.

According to a fifth aspect, in the imaging element unit according to the fourth aspect, the cutting rate in the first region is lower than the cutting rate in the second region.

According to a sixth aspect, in the imaging element unit according to any one of the first to fifth aspects, the optical member is a glass member that cuts infrared light.

According to a seventh aspect, in the imaging element unit according to any one of the first to fifth aspects, the optical member is vibrated by the vibration applying device so that dust adhering to the optical member is removed.

According to an eighth aspect, in the imaging element unit according to any one of the first to seventh aspects, the vibration applying device is a piezoelectric element.

According to a ninth aspect, in the imaging element unit according to any one of the first to eighth aspects, the first surface is a surface of the optical member on an imaging element side.

A shake correction device according to a tenth aspect of the present invention comprises a fixed unit that includes a magnet member and a yoke member; and a movable unit that includes the imaging element unit according to any one of the first to ninth aspects and a coil member, in which an image shake is corrected by moving the movable unit in a plane intersecting an optical axis of the imaging element.

According to an eleventh aspect, in the shake correction device according to the tenth aspect, the yoke member is composed of a first yoke to which the magnet member is provided and a second yoke that is disposed to be spaced apart from the first yoke.

According to a twelfth aspect, in the shake correction device according to the eleventh aspect, at least a part of a gap in a side surface portion between the first yoke and the second yoke is shielded by a first dustproof member.

According to a thirteenth aspect, in the shake correction device according to the eleventh or twelfth aspect, at least a part of a gap between the second yoke and the movable unit in a direction of the optical axis of the imaging element is shielded by a second dustproof member.

According to a fourteenth aspect, in the shake correction device according to any one of the tenth to thirteenth aspects, the movable unit includes a degreasing portion provided on a side opposite to the imaging element with respect to the coil member.

According to a fifteenth aspect, in the shake correction device according to any one of the tenth to fourteenth aspects, the movable unit includes a dust adsorption member at a portion between the coil member and the imaging element.

An imaging apparatus according to a sixteenth aspect of the present invention comprises the shake correction device according to any one of the tenth to fifteenth aspects, and an optical system that forms an optical image of a subject on the imaging element.

According to a seventeenth aspect, in the imaging apparatus according to the sixteenth aspect, other optical components are not interposed in a direction of the optical axis between the optical member and a rearmost lens which is a lens located closest to an imaging surface of the imaging element among lenses constituting the optical system.

According to an eighteenth aspect, in the imaging apparatus according to the sixteenth or seventeenth aspect, the imaging apparatus is a lens-integrated imaging apparatus.

According to a nineteenth aspect, in the imaging apparatus according to any one of the sixteenth to eighteenth aspects, the shake correction device is in contact with a lens frame holding a lens via a buffer member, and the lens frame includes a dust adsorption member at a portion between the coil member and the imaging element.

BRIEF DESCRIPTION OF THE DRAWINGS

FIG. 12 is a view showing a configuration of the imaging element unit in an interchangeable lens camera.

DESCRIPTION OF THE PREFERRED EMBODIMENTS

Hereinafter, preferred embodiments of an imaging element unit, a shake correction device, and an imaging apparatus according to the present invention will be described with reference to the accompanying drawings. In the following drawings, in order to make the description easier to understand, depending on the drawings, some members may not be shown, and/or members may be shown with changes in color, line types, or the like.

First Embodiment

Configuration of Imaging Apparatus

Figure 1:
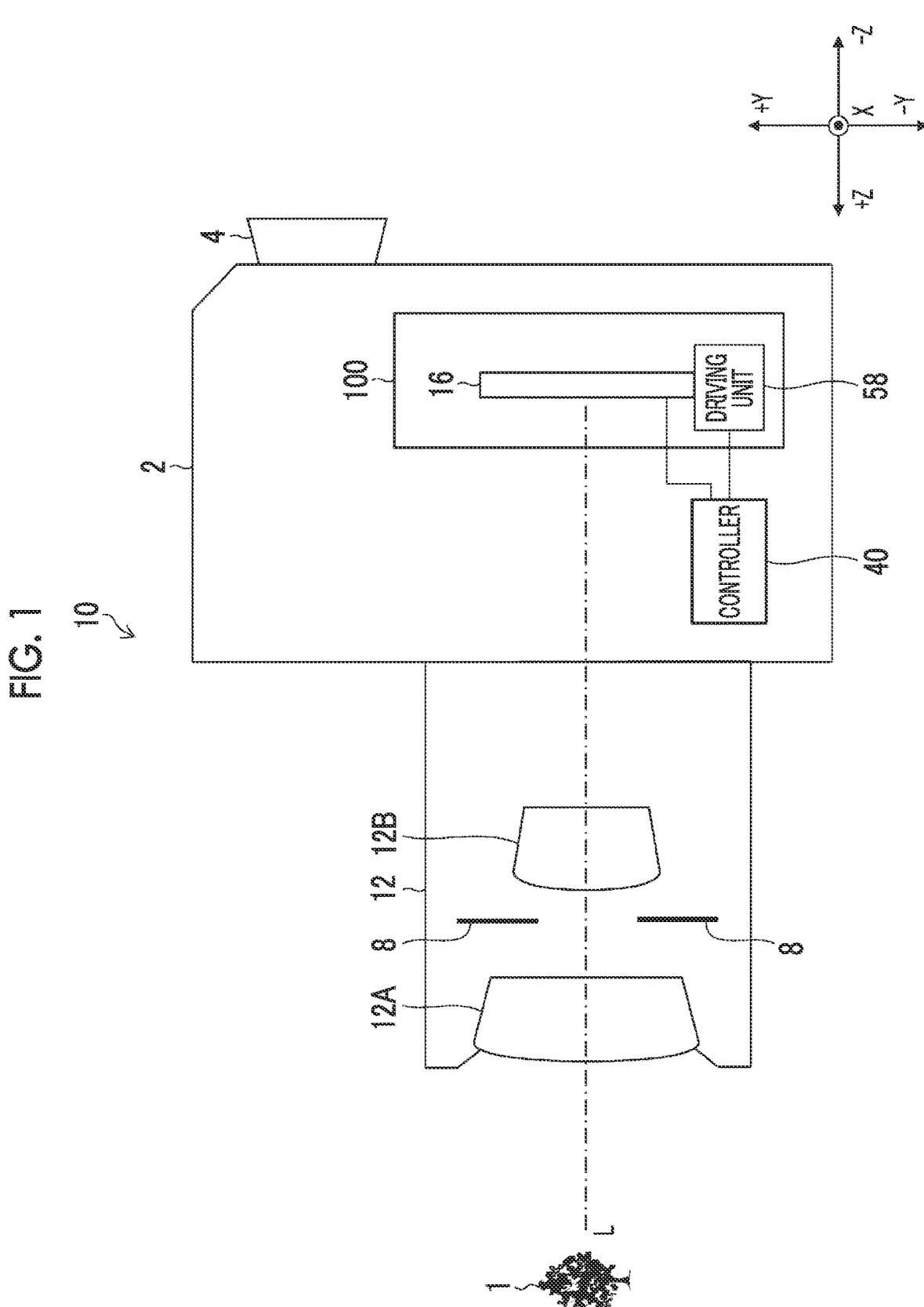
FIG. 1 is a view showing a schematic configuration of an imaging apparatus according to a first embodiment.

First, an imaging apparatus equipped with an imaging element unit and a shake correction device will be described. FIG. 1 is a view showing a schematic configuration of an imaging apparatus according to a first embodiment.

An imaging apparatus 10 (imaging apparatus) is a lens-integrated camera, and a lens device 12 (optical system) is mounted on an imaging apparatus main body 2. The lens device 12 comprises a stop 8 (optical system), a lens group 12A (optical system), and a lens group 12B (optical system), and has an optical axis L (optical axis). The lens device 12 causes an optical image of a subject 1 (subject) to be formed on an imaging element (imaging element 17; see FIGS. 10, 12, and the like) included in an imaging element unit 16 (imaging element unit). The imaging apparatus main body 2 comprises an eyepiece portion 4, and an imager can place his/her eye on the eyepiece portion 4 to visually recognize the subject 1.

The imaging element 17 (imaging element unit 16) is held by a holding frame 112 (see FIG. 7 and the like) of a movable unit 110, and an imaging surface 17A (imaging surface, light-receiving surface; see FIG. 11 or the like) is disposed on the imaging element 17 (imaging element) along a plane (XY plane) composed of two directions (X direction and Y direction) perpendicular to the optical axis L (Z direction). The optical axis L is an axis passing through a center of the imaging element 17, and the imaging element 17 and the lens device 12 are disposed such that the optical axis L of the imaging element 17 and an optical axis of the lens device 12 coincide with each other. Further, as will be described in detail below, a shake correction function is realized by a controller 40 controlling a driving unit 58 of the shake correction device 100. In addition, as described in detail below, the controller 40 vibrates an optical member (optical member 18; see FIG. 11 or the like) using a vibration applying device (piezoelectric element 19; see FIG. 11 or the like), so that dust adhering to the optical member can be removed.

Figure 2:
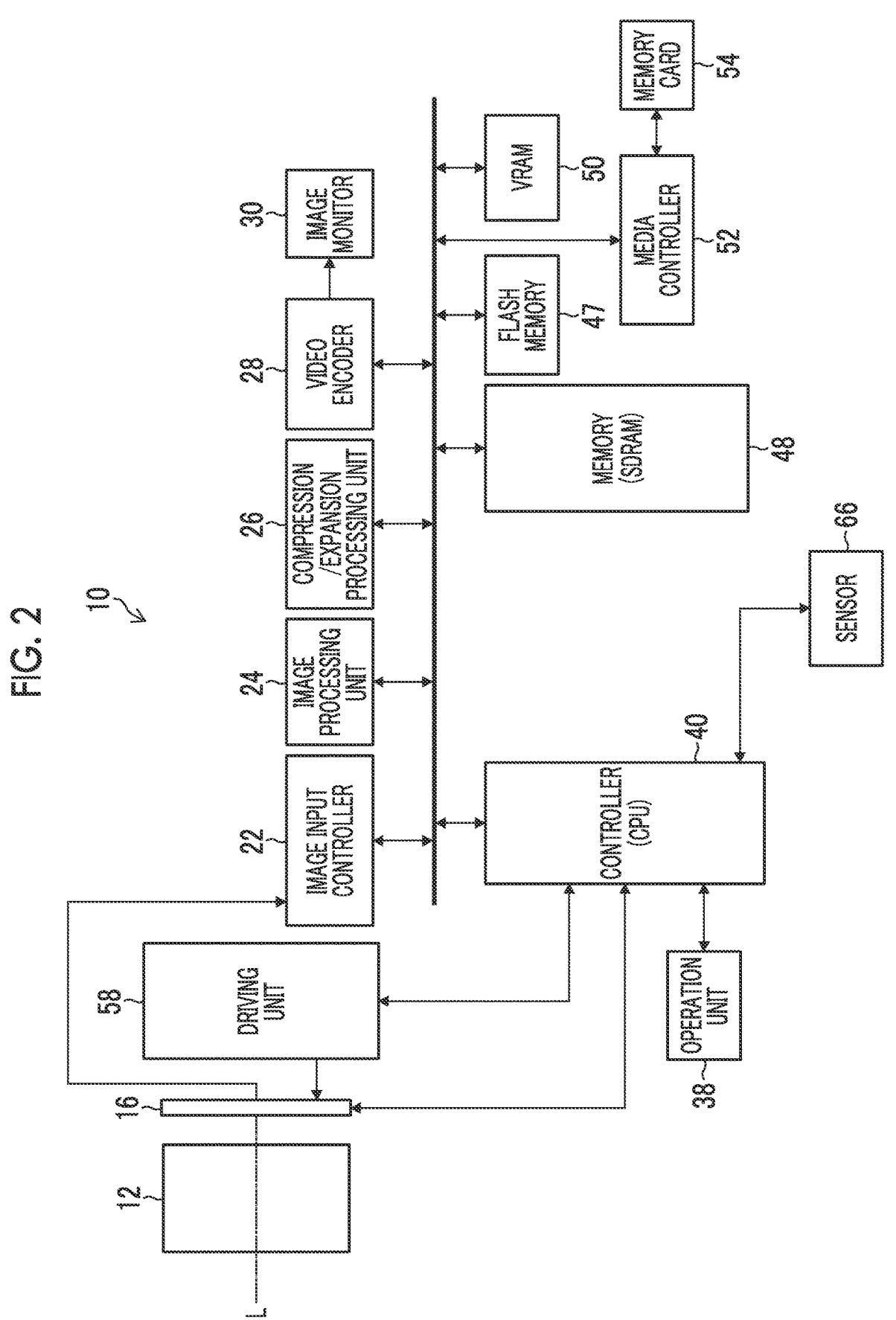
FIG. 2 is a block diagram showing an internal configuration of the imaging apparatus according to the first embodiment.

FIG. 2 is a block diagram showing an aspect of an internal configuration of the imaging apparatus 10. The imaging apparatus 10 records a captured image in a memory card 54, and an operation of the entire apparatus is comprehensively controlled by the controller 40 comprising a processor such as a central processing unit (CPU).

The imaging apparatus 10 is provided with an operation unit 38, such as a shutter button, a power/mode switch, a mode dial, and a cross operation button. A signal (command) from the operation unit 38 is input to the controller 40, and the controller 40 controls each circuit of the imaging apparatus 10 based on the input signal to perform drive control of the imaging element 17, lens drive control, stop drive control, imaging operation control, image processing control, recording/reproduction control of image data, display control of an image monitor 30, and the like.

A luminous flux that has passed through the lens device 12 is imaged on the imaging element 17 (imaging element) which is a complementary metal-oxide semiconductor (CMOS) type color image sensor. The imaging element 17 is not limited to the CMOS type and may be another type of image sensor such as a charge coupled device (CCD) type or an organic imaging element.

In the imaging element 17, a large number of light-receiving elements (photodiodes) are two-dimensionally arranged, and a subject image formed on the light-receiving surface of each light-receiving element is converted (photoelectrically converted) into a signal voltage (or charge) of an amount corresponding to an amount of incidence rays, and is converted into a digital signal via an analog/digital (A/D) converter in the imaging element 17 to be output.

An image signal (image data) read from the imaging element 17 in a case of capturing a motion picture or a still picture is temporarily stored in a memory 48 (for example, a synchronous dynamic random access memory (SDRAM)) via an image input controller 22.

Further, a flash memory 47 stores various parameters and tables used for a camera control program, image processing, and the like.

A sensor 66 is a camera shake sensor and detects posture information and posture change information of the imaging apparatus 10. The sensor 66 is configured of, for example, a gyro sensor. The sensor 66 is configured of, for example, two gyro sensors to detect a camera shake amount in a vertical direction (+Y, −Y direction) and a camera shake amount in a horizontal direction (+X, −X direction), and the detected camera shake amount (angular velocity) is input to the controller 40. The controller 40 performs shake correction by controlling the driving unit 58 to move the imaging element 17 such that the movement of the subject image corresponding to the camera shake is canceled. A gyro sensor for detecting a camera shake amount in a rotation direction (for example, around a Z axis) may be provided in the sensor 66, and the shake correction may be performed so as to cancel the camera shake in the rotation direction.

The driving unit 58 (driving mechanism) is controlled by the controller 40. The driving unit 58 is composed of a voice coil motor (VCM) or the like described below.

An image processing unit 24 reads unprocessed image data that is acquired via the image input controller 22 in case of capturing a motion picture or a still picture and temporarily stored in the memory 48. The image processing unit 24 performs offset processing, pixel interpolation processing (interpolation processing for a phase difference detecting pixel, a defective pixel, and the like), white balance correction, gain control processing including sensitivity correction, gamma-correction processing, synchronization processing (also called "demosaicing"), brightness and color difference signal generation processing, edge enhancement processing, color correction, and the like on the read image data. The image data that is processed by the image processing unit 24 and is processed as a live view image is input to a video random access memory (VRAM) 50.

The image data read from the VRAM 50 is encoded by a video encoder 28 and output to the image monitor 30 provided on a rear surface of the camera. Accordingly, the live view image showing the subject image is displayed on the image monitor 30.

The image data that is processed by the image processing unit 24 and is processed as a still picture or motion picture for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a still picture or a motion picture. The compressed image data is recorded in the memory card 54 via a media controller 52.

Further, the compression/expansion processing unit 26 performs expansion processing on the compressed image data obtained from the memory card 54 via the media controller 52 in a playback mode. The media controller 52 records and reads the compressed image data to and from the memory card 54.

In the above embodiment, a hardware structure of a processing unit such as the controller 40 that executes various kinds of processing includes various processors to be described below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured of one of these various processors, or may be configured of two or more same type or different types of processors (for example, a plurality of FPGAs or a combination of the CPU and the FPGA). In addition, a plurality of processing units may be configured of one processor. As an example of configuring the plurality of processing units by one processor, first, there is a form in which one processor is configured of a combination of one or more CPUs and software, as typified by a computer such as a client or a server, and the one processor functions as the plurality of processing units. Second, there is a form in which a processor that realizes functions of an entire system including a plurality of processing units with one integrated circuit (IC) chip is used, as typified by a system on chip (SoC) or the like. As described above, the various processing units are configured using one or more of the above various processors as a hardware structure.

Furthermore, the hardware structure of those various processors is more specifically an electric circuit (circuitry) in which circuit elements such as semiconductor elements are combined.

Configuration of Shake Correction Device

Next, a configuration of the shake correction device 100 will be described. In the following description, a "front surface" is a surface seen from a +Z side (subject side), and a "rear surface" is a surface seen from a −Z side (imager side).

Figure 3:
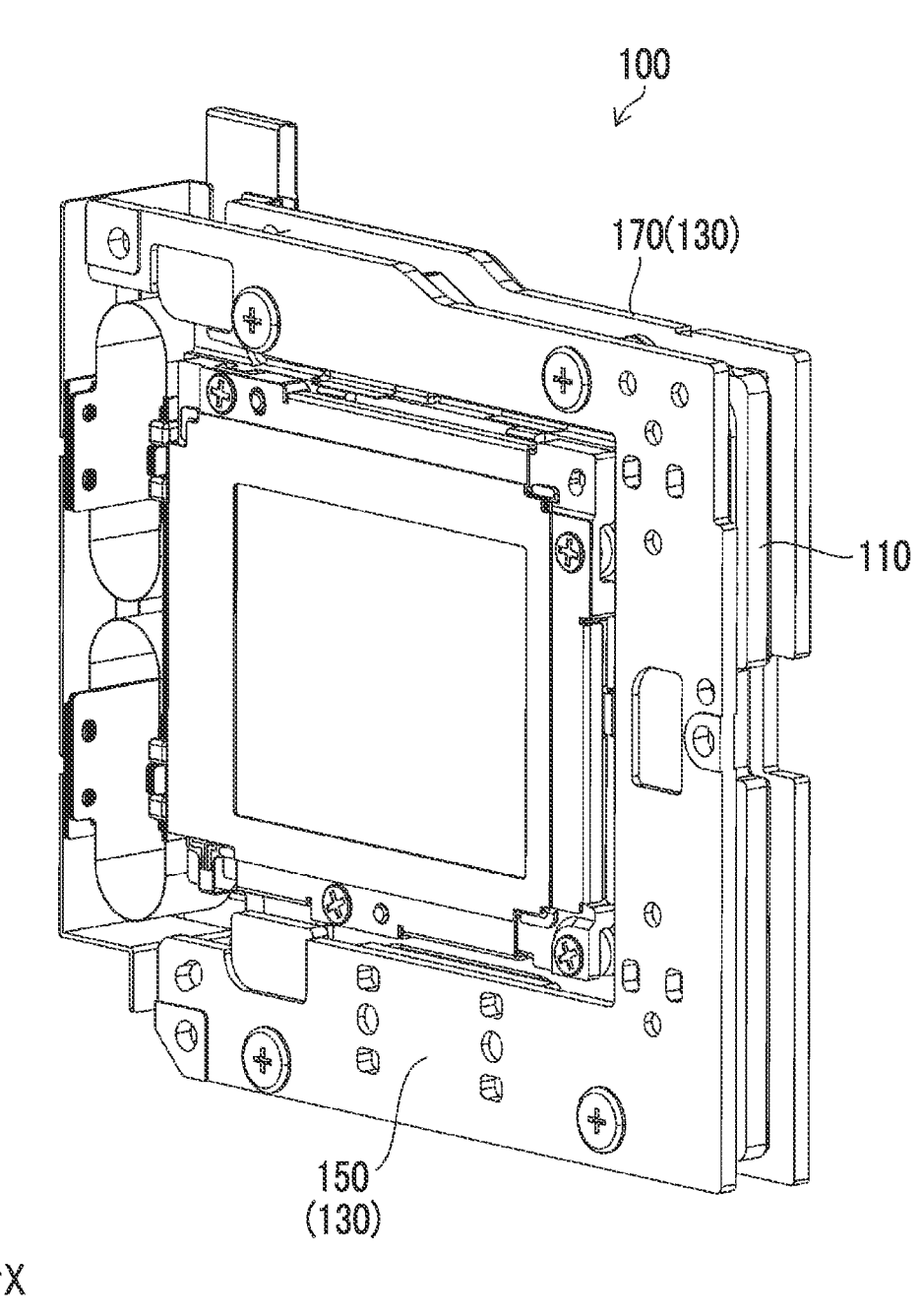
FIG. 3 is a front perspective view showing a configuration of a shake correction device.

As shown in FIG. 3, the shake correction device 100 is mainly composed of the movable unit 110 (movable unit) by which the imaging element unit 16 (imaging element unit) is held and a fixed unit 130 (fixed unit) fixed to the imaging apparatus main body 2. The fixed unit 130 comprises a drive yoke 150 (yoke member; first yoke) and a counter yoke 170 (yoke member; second yoke). The drive yoke 150 and the counter yoke 170 are disposed to be spaced from each other and are connected to each other by a shaft (not shown). The movable unit 110 is biased toward the drive yoke 150 side (+Z side; subject side) by magnetic springs 162, 164, and 166 (biasing members; see FIG. 9), which will be described below.

Structure of Fixed Unit

Figure 4:
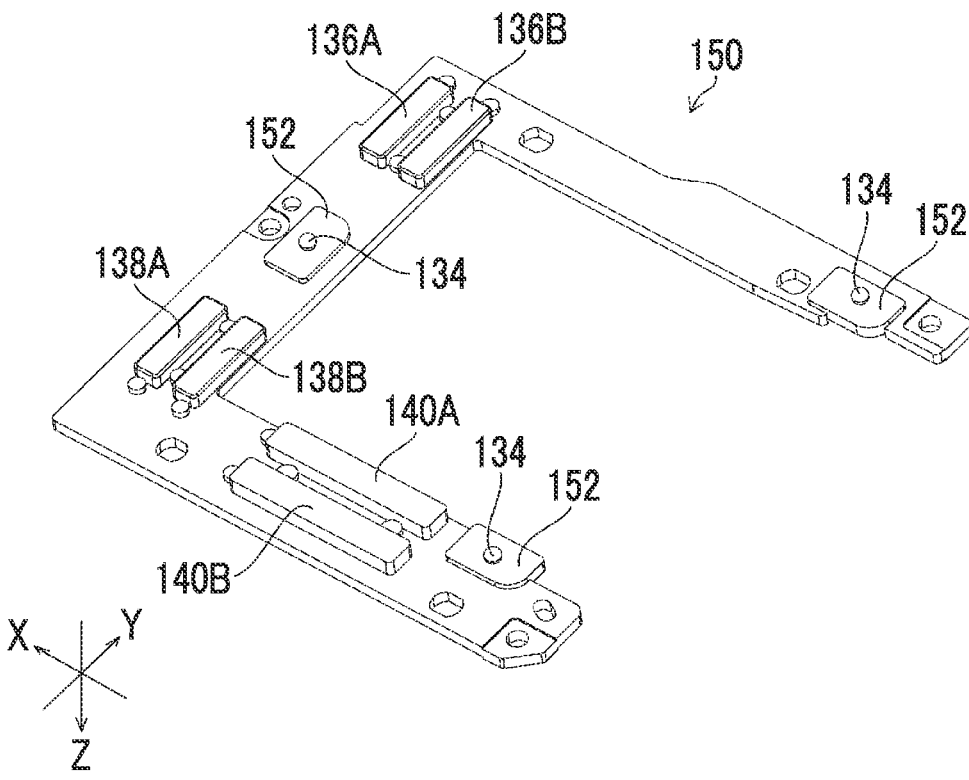
FIG. 4 is a perspective view showing a state in which a drive yoke is viewed from an imager side (−Z side).

FIG. 4 is a view showing a state in which the drive yoke 150 (yoke member; first yoke) is viewed from the imaging surface side (−Z side). The drive yoke 150 has a shape in which a −X side is open, and a flexible printed circuit (FPC) or the like is disposed on the −X side (see FIG. 3).

In addition, a magnet member is disposed on the drive yoke 150. Specifically, as shown in FIG. 4, magnets 136A and 136B (magnet members) are disposed on a (+X, +Y) side, magnets 138A and 138B (magnet members) are disposed on a (+X, −Y) side, and magnets 140A and 140B (magnet members) are disposed on the −X side with respect to these magnets. These magnets and a coil (coil member; see FIGS. 7 and 11) provided in the movable unit 110 constitute a voice coil motor (VCM). For example, N poles of the magnets 136A, 138A, and 140A can be disposed on an upper side (−Z side) in FIG. 4, and conversely, S poles of the magnets 136B, 138B, and 140B can be disposed on the upper side. However, directions of the magnetic poles of the magnets may be opposite thereto.

First Ball Receiving Surface

The drive yoke 150 is provided with first ball receiving surfaces 152 (first ball receiving surfaces) at three locations. The first ball receiving surface 152 is a partial region of the drive yoke 150 (first yoke) and is a protruding portion toward the movable unit side. The first ball receiving surface 152 can be formed integrally with the drive yoke 150, for example, by press-working a member constituting the drive yoke 150. The press-working is, for example, half punching (referring to processing in which a height of about half a thickness of the member is protruded without completely penetrating the member; sometimes referred to as half blanking, half penetration, punching, doweling, or the like). However, the height of the protruding portion is not limited to half the thickness of the member. Further, the first ball receiving surface 152 is preferably a surface formed by machining the protruding portion formed by half punching. Here, the machining is to process a material into a target shape by using a machine, and there are a plurality of types such as cutting and press-working. For example, processing to increase flatness can be performed by polishing. As described above, since the first ball receiving surface 152 is a partial region of the drive yoke 150, it is not necessary to perform machining on the entire drive yoke 150, and it is possible to reduce a cost of the shake correction device 100.

A ball 134 (ball) is in contact with the first ball receiving surface 152 formed as described above, and the ball 134 rolls on the first ball receiving surface 152. That is, the movable unit 110 holding the imaging element 17 (imaging element unit 16) is supported to be movable in a plane intersecting the optical axis L, and it is possible to correct an image shake by the movement of the movable unit 110. Note that "the plane intersecting the optical axis L" is preferably a plane perpendicular to the optical axis L.

Figure 5:
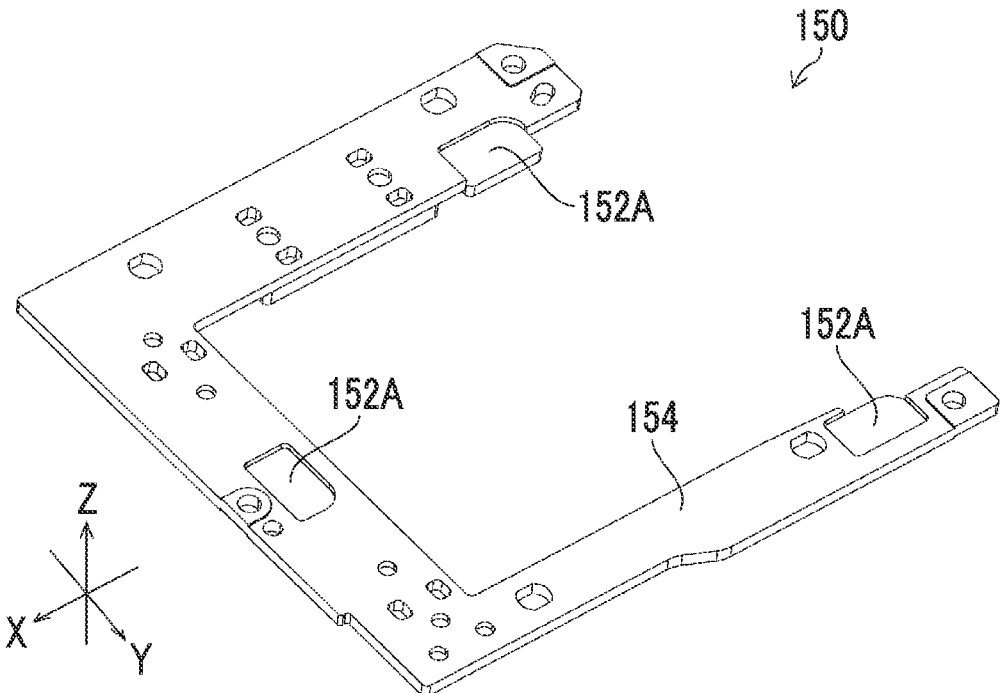
FIG. 5 is a perspective view showing a state in which the drive yoke is viewed from a subject side (+Z side).

FIG. 5 is a perspective view showing a state in which the drive yoke 150 is viewed from the +Z side (subject side). As shown in FIG. 5, in a case where a portion of the first ball receiving surface 152 is viewed from the +Z side, it can be seen that a recessed portion 152A (recessed portion) is formed. The shake correction device 100 is attached to the imaging apparatus main body 2 via a mounting surface 154 (mounting surface) which is a surface on a side opposite to the first ball receiving surface 152 (see FIG. 10).

Material of Drive Yoke (First Yoke)

The drive yoke 150 (first yoke) described above is formed of a material having a saturation magnetic flux density of 0.6 T or more and a surface hardness of 290 Hv or more. As such a material, for example, a SUS630 material and a SUS631 material can be used. These materials are precipitation hardening stainless steels, which are magnetic materials having a relatively high residual magnetic flux density, and can satisfy performance required for a saturation magnetic flux density and a surface hardness. Although there are a plurality of materials having different characteristics for the SUS630 material and the SUS631 material, it is preferable that the drive yoke 150 (first yoke) is formed of a material having a surface hardness of 350 Hv or more among those materials.

Figure 6:
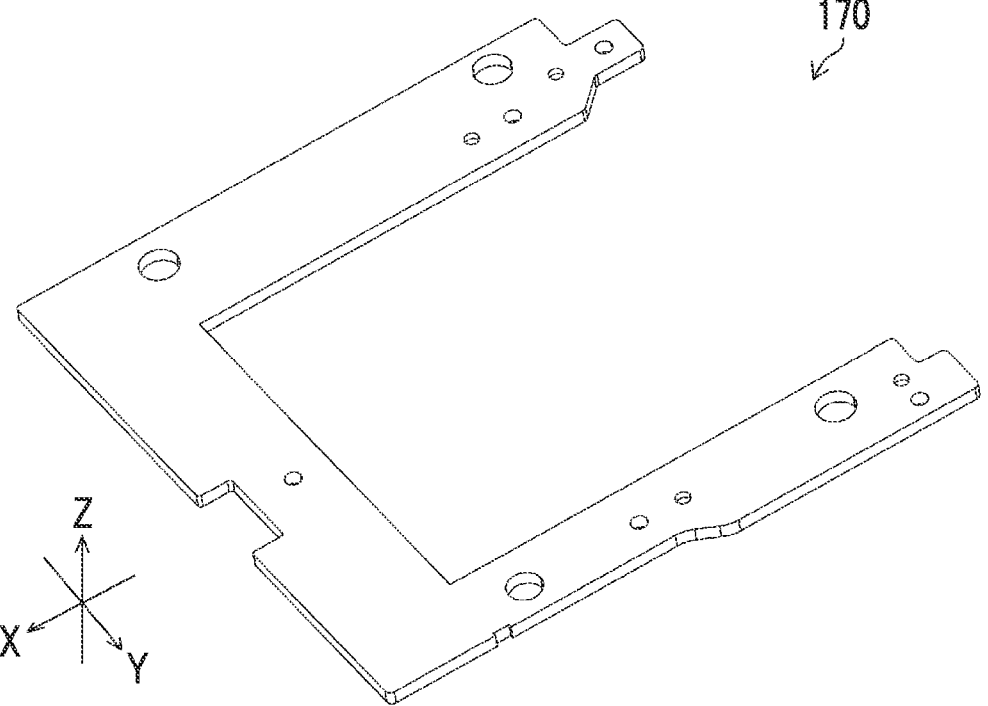
FIG. 6 is a perspective view showing a state in which a counter yoke is viewed from the subject side (+Z side).

FIG. 6 is a view showing a state in which the counter yoke 170 is viewed from the subject side (+Z side).

Configuration of Movable Unit

Figure 7:
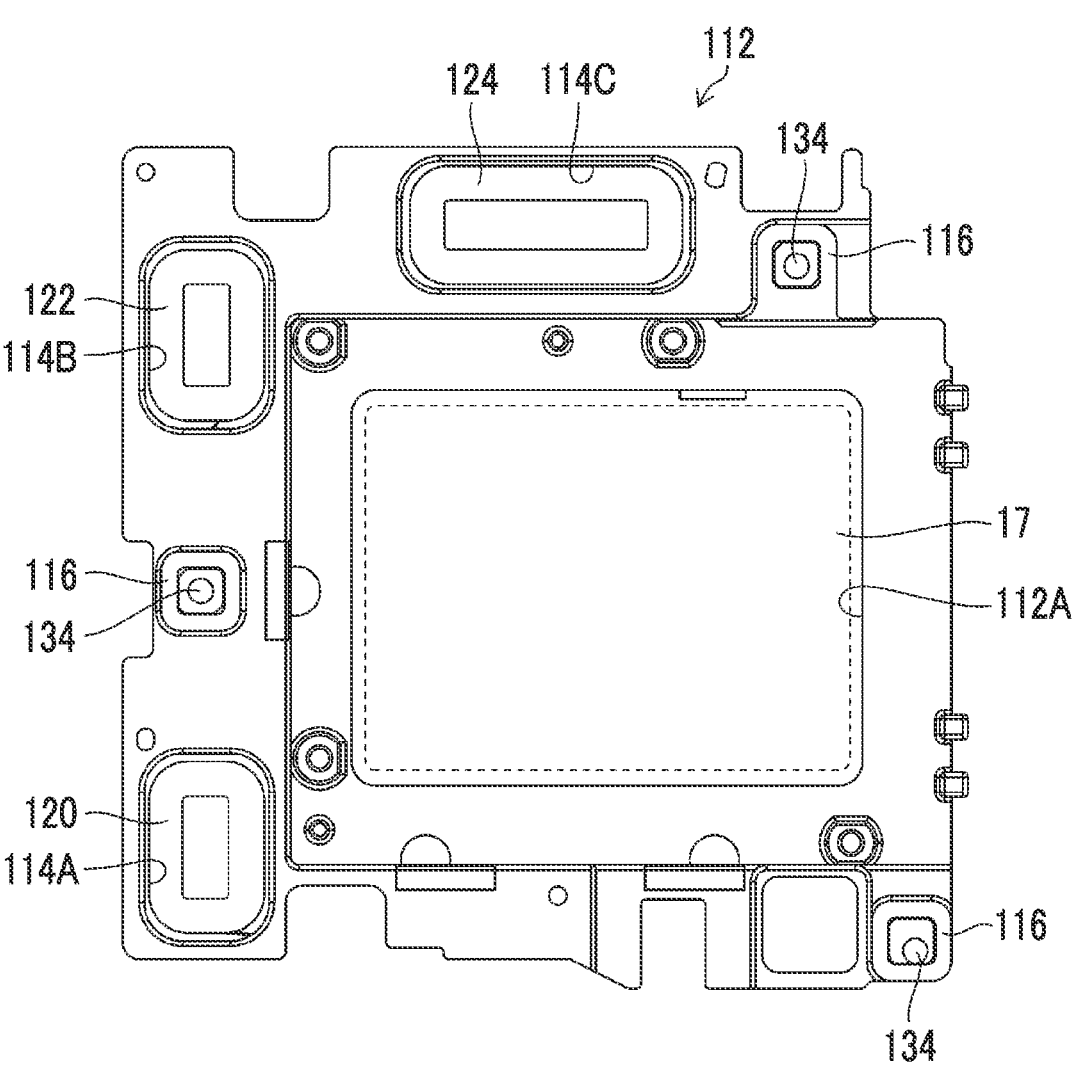
FIG. 7 is a front view showing a holding frame of a movable unit.

FIG. 7 is a front view showing the holding frame 112 (holding frame) of the movable unit 110. The holding frame 112 includes an opening 112A, and the imaging element 17 (imaging element unit 16; not shown in FIG. 7) is disposed in the opening 112A. Further, the holding frame 112 includes openings 114A, 114B, and 114C, and coils 120, 122, and 124 (coil members) are disposed in the openings, respectively. Further, in the holding frame 112, ball holding portions 116 (ball holding portions) that hold the balls 134 are formed at three locations. The ball holding portions 116 are formed at positions corresponding to the first ball receiving surfaces 152 described above.

State in which Ball is Received on First Ball Receiving Surface

Figure 8:
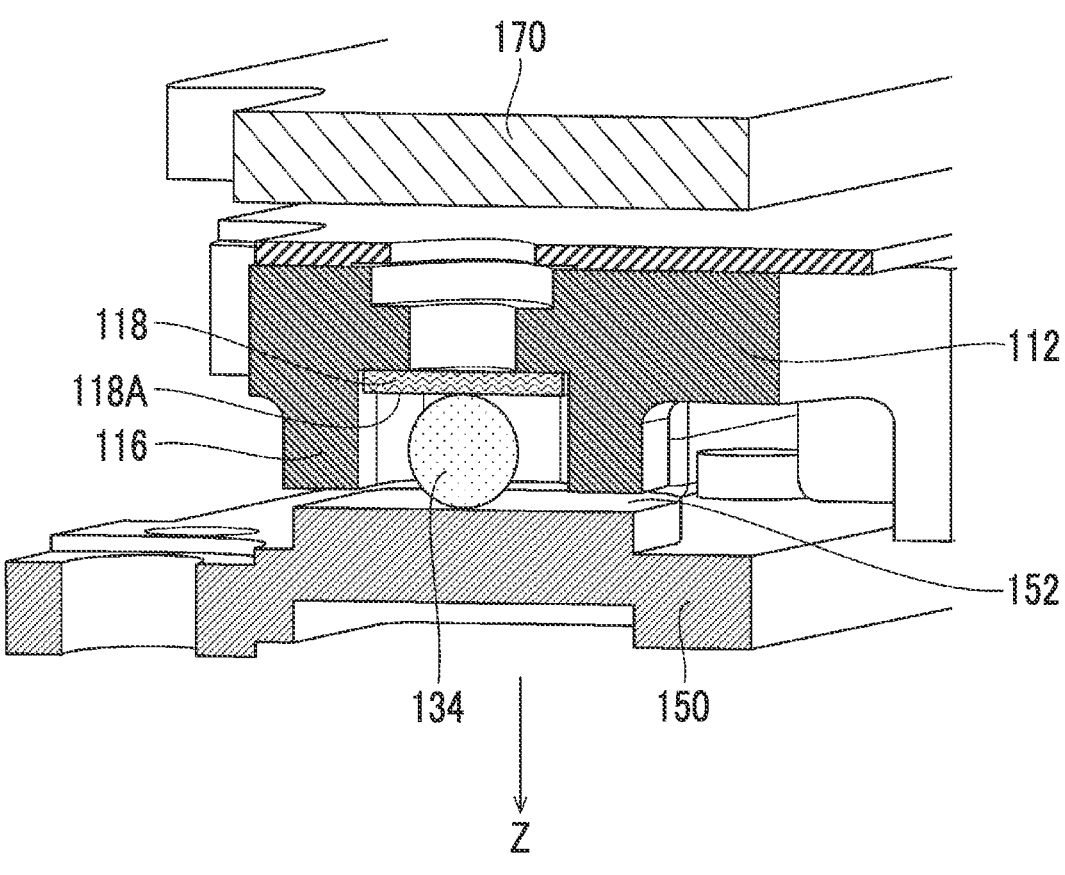
FIG. 8 is a view showing a state in which a ball is received on a first ball receiving surface.

FIG. 8 is a view (partial cross-sectional view) showing a state in which the ball 134 is received on the first ball receiving surface 152. A ball receiving member 118 is disposed in the ball holding portion 116, and a surface of the ball receiving member 118 on the +Z side is in contact with the ball 134 as a second ball receiving surface 118A (second ball receiving surface). In a state in which the shake correction device 100 is assembled, the ball 134 held by the ball holding portion 116 is in contact with the first ball receiving surface 152, and the ball 134 rolls on the first ball receiving surface 152 as the movable unit 110 moves. In a case where biasing is unbalanced or the like, it is acceptable for a part of the three balls 134 to float from the first ball receiving surface 152.

Effect Exhibited by Selection of Material and Integration of Components

In order to allow the movable unit 110 to move in translation or to rotate without falling with respect to a plane (vertical plane) intersecting the optical axis L, the first ball receiving surface 152 is required to have a high flatness. Therefore, there is a demand for high-accuracy assembly in which a high flatness is ensured in the fixed unit 130 in which the first ball receiving surface 152 and the yokes (drive yoke 150 and counter yokes 170) are assembled. In the related art, the ball receiving surface and the yoke are joined to each other by a strong instant adhesive, spot welding, or the like.

Assembling with an adhesive is a complicated process such as bonding an adhering surface to the yoke and a side surface of the yoke together while handling components to avoid scratches and dents on the ball receiving surface, and is a high-cost process in which it is difficult to control an assembly quality, because the ball receiving surface is tilted in a case where an adhesive thickness applied to the adhering surface is not uniform, and the followability of the movable unit deteriorates in a case where the adhesive adheres to the ball receiving surface. Assembling by spot welding is a process that requires dedicated equipment and welding knowledge, and is also a high-cost process in which it is difficult to control an assembly quality, because the ball receiving surface is distorted or peeled off in a case where welding conditions are not appropriate.

As described in the present embodiment, in the component in which the yoke and the ball receiving surface are integrated using a material having a high saturation magnetic flux density and a high surface hardness, such as a SUS630 material or a SUS631 material, such joining processes are unnecessary. As a result, cost reduction can be expected in terms of assembly man-hours, equipment, and quality control. In addition, in a case where machining such as half punching is performed on the integrated component, a high flatness can be realized by forming the ball receiving surface having a protruding shape such that warping or distortion is small, and shake correction with high accuracy is achieved.

In a case of designing a VCM of a BIS in a lens-interchangeable camera, it is assumed that a user uses the VCM in combination with various lenses, and the VCM that will work even with a lens with the strictest performance requirements is designed. Therefore, the BIS has a large movable amount. The maximum thrust force of the VCM is obtained in a case where the movable unit is at the center, and the thrust force decreases as the movable unit moves away from the center. It was inevitable to use a yoke made of a SPCC material in a VCM design for generating a necessary and sufficient thrust force in the vicinity of a movable region end portion of the BIS having a large movable amount. Meanwhile, in a case of designing a VCM of a BIS in a lens-integrated camera, since a combination of a lens and a body is determined on a one-to-one basis, the VCM can be individually optimized in accordance with the performance of the lens. This means that the BIS has a movable amount suppressed to the necessary minimum and that it is possible to perform a VCM design that satisfies the required performance by using a yoke of the SUS630/631 material instead of a yoke of the SPCC material.

Attachment of Shake Correction Device

The mounting surface of the shake correction device 100 is the mounting surface 154 that is a surface (surface on the subject side; surface on the +Z side) on a side opposite to the first ball receiving surface 152 of the integrated component (drive yoke 150; the first yoke), and the mounting surface 154 is a reference surface for fastening the shake correction device 100 to the imaging apparatus main body 2. The lens device 12 is attached to the imaging apparatus main body 2 via a mount surface 13 (see FIG. 10).

Relationship Between Whether or not to Interchange Lens and Biasing Direction of Movable Unit A lens-interchangeable camera has a mount structure in which a lens can be attached and detached, and a user can clean the imaging element from the mount. In this case, the imaging element is touched in a case of performing cleaning using cleaning paper or the like. Even in a camera equipped with a shake correction mechanism (BIS), in a case of a BIS configuration in which a pressing direction of paper and a biasing direction of the movable unit are the same direction, there is no rattling in an optical axis direction even in a case where the imaging element is touched, and the quality is not impaired. Meanwhile, in a case where the pressing direction of the paper and the biasing direction of the movable unit are opposite to each other, there is rattling in the optical axis direction in a case where the imaging element is touched and the quality may impaired. For this reason, in the related art, the BIS is configured such that the pressing direction of the paper and the biasing direction of the movable unit are the same direction.

In contrast to such a lens-interchangeable camera, a lens-integrated camera has a structure that a user cannot directly access the imaging element. Accordingly, there is no problem even in a case where the biasing direction of the movable unit is reversed to the +Z side (subject side), and furthermore, it is possible to achieve a reduction in cost due to a simple BIS configuration. The present embodiment is effective in a shake correction device having such a configuration and a camera (particularly, a lens-integrated camera) comprising such a shake correction device.

Biasing Performed by Biasing Member

Figure 9:
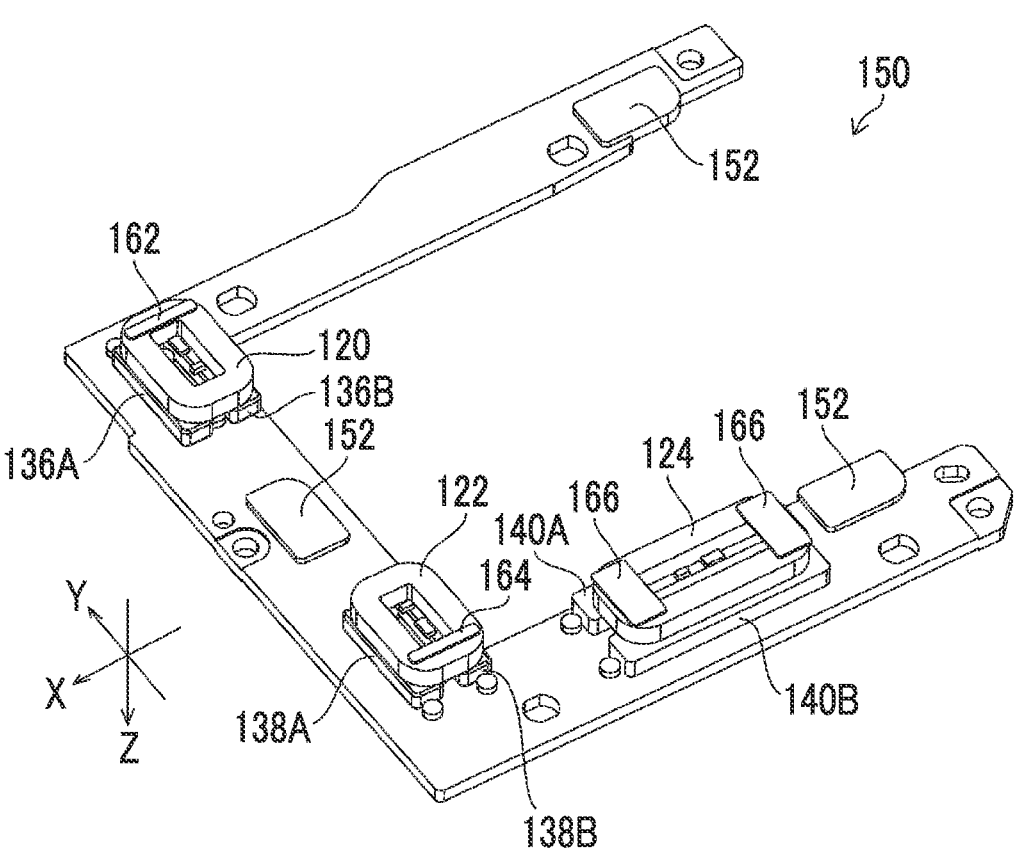
FIG. 9 is a view showing a state of biasing performed by a biasing member.

FIG. 9 is a view showing a state of biasing performed by the biasing member. As shown in FIG. 9 and as described above with reference to FIG. 4, the magnets 136A, 136B, 138A, 138B, 140A, and 140B are disposed on the drive yoke 150 (first yoke), and the coils 120, 122, and 124 are disposed on the −Z sides of these magnets. Further, the magnetic springs 162, 164, and 166 (biasing members) are disposed on the −Z sides of those coils, and the movable unit 110 (including the imaging element unit 16 held by the holding frame 112 and the coils 120, 122, and 124) is biased to the drive yoke 150 (first yoke) by these magnetic springs. That is, in the shake correction device 100, the biasing direction of the movable unit is a +Z direction (subject side).

The magnetic springs 162, 164, and 166 are one aspect of biasing members, and other biasing members, such as mechanical springs, may be used. In addition, the number and positions of the magnetic springs (biasing members) are not limited to the aspect of FIG. 9.

Number of Components and Unlikelihood of Falling of Shake Correction Device

The mounting surface 154 (mounting surface), which is a surface on a side opposite to the first ball receiving surface 152 formed integrally with the drive yoke 150 (first yoke), is a reference surface for attaching the shake correction device 100 to the imaging apparatus main body 2. The mount surface 13 for attaching the lens device 12 is present on the imaging apparatus main body 2, and it is required to attach the shake correction device 100 such that the imaging surface 17A of the imaging element 17 is parallel to the mount surface 13. In a case where the number of components interposed between the imaging element 17 and the mounting surface 154 is large, component tolerances are accumulated by the number of the components. That is, the mounting surface 154 is likely to fall (likely to be inclined) with respect to the imaging element 17, and it is difficult to make the mounting surface 154 parallel to the imaging element 17.

As described above, in the shake correction device of the lens-interchangeable camera in the related art, the movable unit is biased to the fixed unit on the imaging surface side (−Z side). In the shake correction device having such a configuration, a ball receiving surface of a movable unit, a ball, a ball receiving surface of a fixed unit, a base yoke, a shaft, and a front yoke are interposed between the imaging element and the imaging apparatus main body.

In contrast, in the shake correction device 100 according to the present embodiment, the movable unit 110 is biased to the fixed unit (drive yoke 150) on the subject side (+Z side) as described above with reference to FIGS. 8 and 9. In the shake correction device 100 having such a configuration, the second ball receiving surface 118A of the movable unit 110, the ball 134, and the drive yoke 150 (first yoke) are interposed between the imaging element 17 and the imaging apparatus main body 2. Further, in the shake correction device 100 (movable unit 110), the counter yoke 170 is attached to the drive yoke 150 via a shaft (not shown). However, in the sense of "falling of the mounting surface 154 with respect to the imaging element 17", the shaft and the counter yoke 170 are not interposed.

In such a shake correction device 100, since the number of components interposed between the imaging element 17 and the mounting surface 154 is smaller than that in the shake correction device in the related art, the shake correction device 100 is configured to be less likely to fall.

Accordingly, it is possible to eliminate a tilt adjustment process for making the imaging element 17 parallel to the mount surface 13 or to reduce adjustment man-hours, so that cost reduction is achieved.

Figure 10:
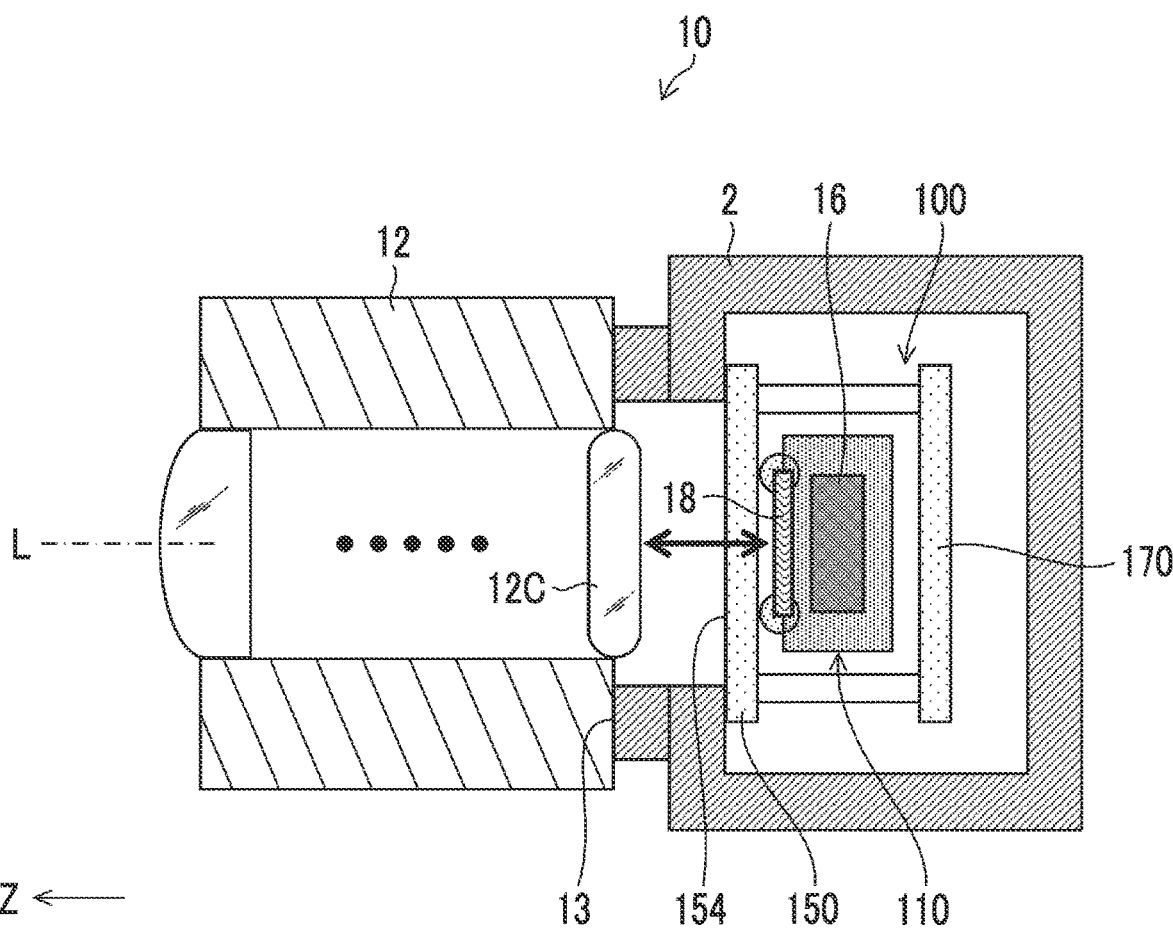
FIG. 10 is a schematic view showing a positional relationship between a rearmost lens and an optical member.

Influence of Configuration of Shake Correction Device on Configuration of Imaging Apparatus FIG. 10 is a schematic view showing a positional relationship between a rearmost lens and an optical member. In a case where the imaging apparatus 10 is of a lens-integrated type, in the shake correction device 100, a distance between the optical member 18 disposed in front (+Z side) of the imaging element unit 16 and a lens rearmost surface (surface on the −Z side of a rearmost lens 12C) can be designed to be short. This is because, in a case where the biasing direction of the movable unit 110 is to the imaging surface side (imager side; −Z side), there is a concern that the rearmost lens 12C and an optical member 126 may come into contact with each other in a case where an external force such as drop or vibration is applied in a direction opposite to the biasing direction so that the movable unit 110 floats to the (+Z side), but in a case where the biasing direction of the movable unit 110 is to the subject side (+Z side) as in the first embodiment, a direction in which the movable unit 110 floats by the external force is reversed (to the −Z side), so that the optical member 18 moves away from the rearmost lens 12C, and the movable unit 110 does not come into contact with the rearmost lens 12C. It is assumed that other optical components (a lens, a filter, a glass member, or the like) are not interposed between the optical member 18 and the rearmost lens 12C in the direction of the optical axis L. However, a buffer member, a mounting bracket, or the like may be interposed.

Configuration of Imaging Element Unit

Figure 11:
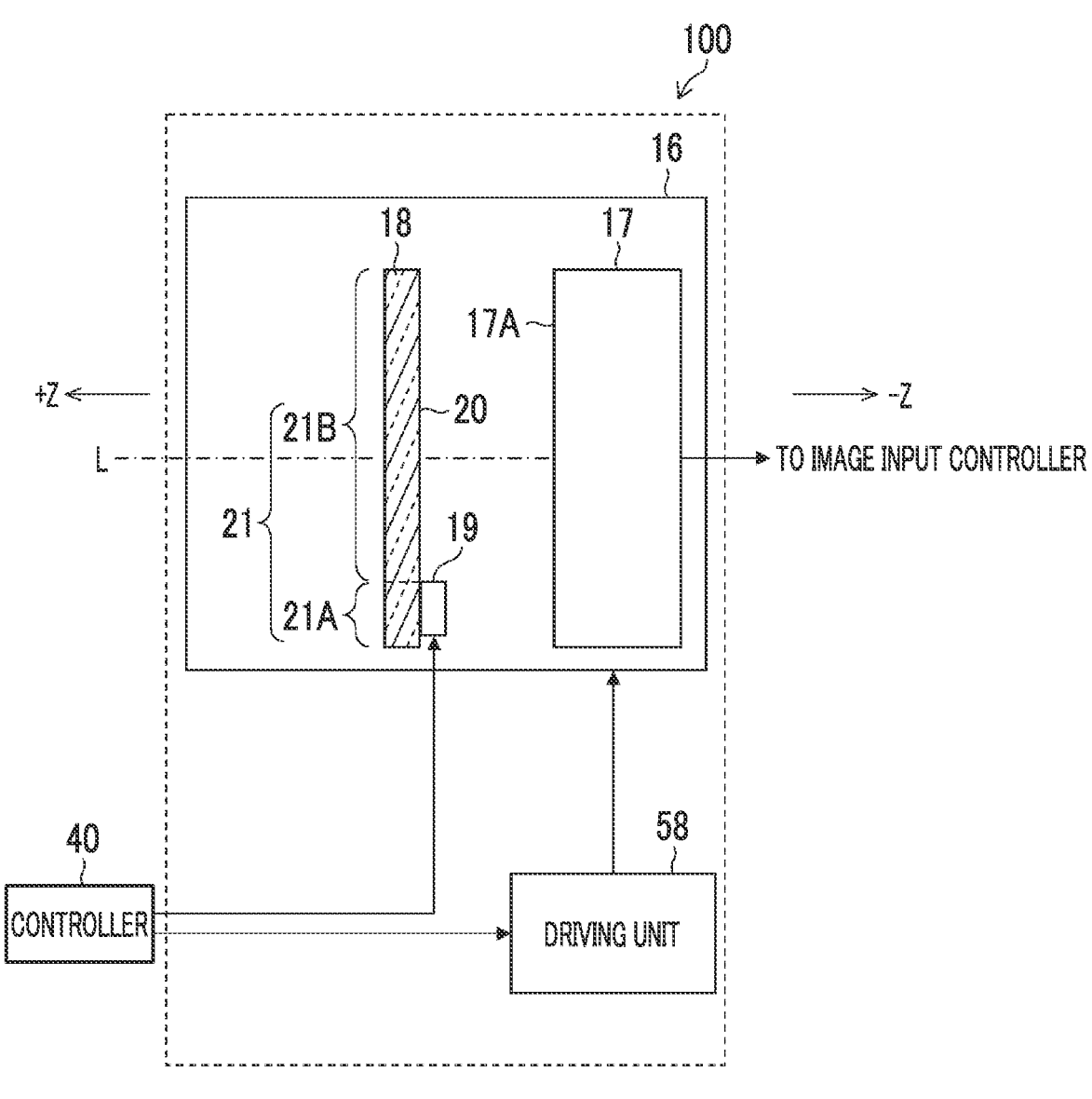
FIG. 11 is a view showing a state in which an imaging element unit is controlled.

FIG. 11 is a view showing a schematic configuration of the imaging element unit according to the first embodiment. As shown in FIG. 11, the imaging element unit 16 (imaging element unit) comprises the imaging element 17 (imaging element) and the optical member 18 (optical member). The piezoelectric element 19 is disposed on a first surface 20 (first surface; surface on the −Z side) of the optical member 18. A second surface 21 of the optical member 18 has a first region 21A and a second region 21B as will be described in detail later.

Measures Against Dust in Shake Correction Device

Next, measures against dust in the shake correction device will be described.

In a digital camera, a model that is equipped with an optical image stabilization function and copes with an image shake caused by the camera shake is known. In the related art, optical image stabilization (OIS) with a lens device has been a mainstream mechanism for image stabilization. However, in recent years, in order to improve the performance of the digital camera and to reduce an overall size of a camera device configured of a camera and a lens device, an increasing number of models are equipped with an in-body image stabilization (BIS, also known as IBIS) for driving an imaging element or the like to perform correction. In recent years, a resolution and an image quality of the imaging element have been increased so that the imaging element has become larger, and a BIS unit (shake correction device) has also become larger as the larger imaging element is used. Since a higher image quality is required, there is a problem in that dust and the like adhere to the imaging element or the optical element disposed near the imaging element so that the dust is reflected in the image. Therefore, inside the camera, the imaging element is sealed with an optical dummy glass placed in front of the imaging element to prevent dust from entering, and the dust is prevented from being reflected in the image by a dust reduction (DR, also called dust removal) function of vibrating the glass to drop dust that adheres to a surface of the dummy glass.

Measures Against Dust in Lens-Interchangeable Camera and Lens-Integrated Camera

In the lens-interchangeable camera, the lens can be removed, and a periphery of the imaging element can be manually cleaned to remove the dust. As a result, it is possible to take measures against the dust. Therefore, even in a case where the dust is generated by the operation of the BIS unit that drives the imaging element, the dust does not continuously accumulate inside the camera with cleaning, and thus there is no problem. On the other hand, in the lens-integrated camera, once the dust or the like is generated by the operation of the BIS unit that drives the imaging element, the dust continuously accumulates inside the camera. For this reason, it is necessary to provide a DR function in the BIS unit to drop the dust, restrict movement of the dust, or capture the dust to suppress reflection of the dust in the image.

In addition, in the lens-integrated camera, a combination of the lens and the camera body is determined on a one-to-one basis, and it is possible to design an optical system of the lens including the optical element disposed in front of the imaging element. Therefore, the dummy glass for giving versatility does not need to be placed on a front surface of the imaging element unlike the lens-interchangeable camera, and it is possible to design a DR mechanism unit configured by only disposing an infrared ray (IR) cut glass. In this case, the piezoelectric element is bonded and fixed to the IR cut glass, and a voltage is applied to the piezoelectric element to vibrate the IR cut glass to drop the dust.

Figure 12:
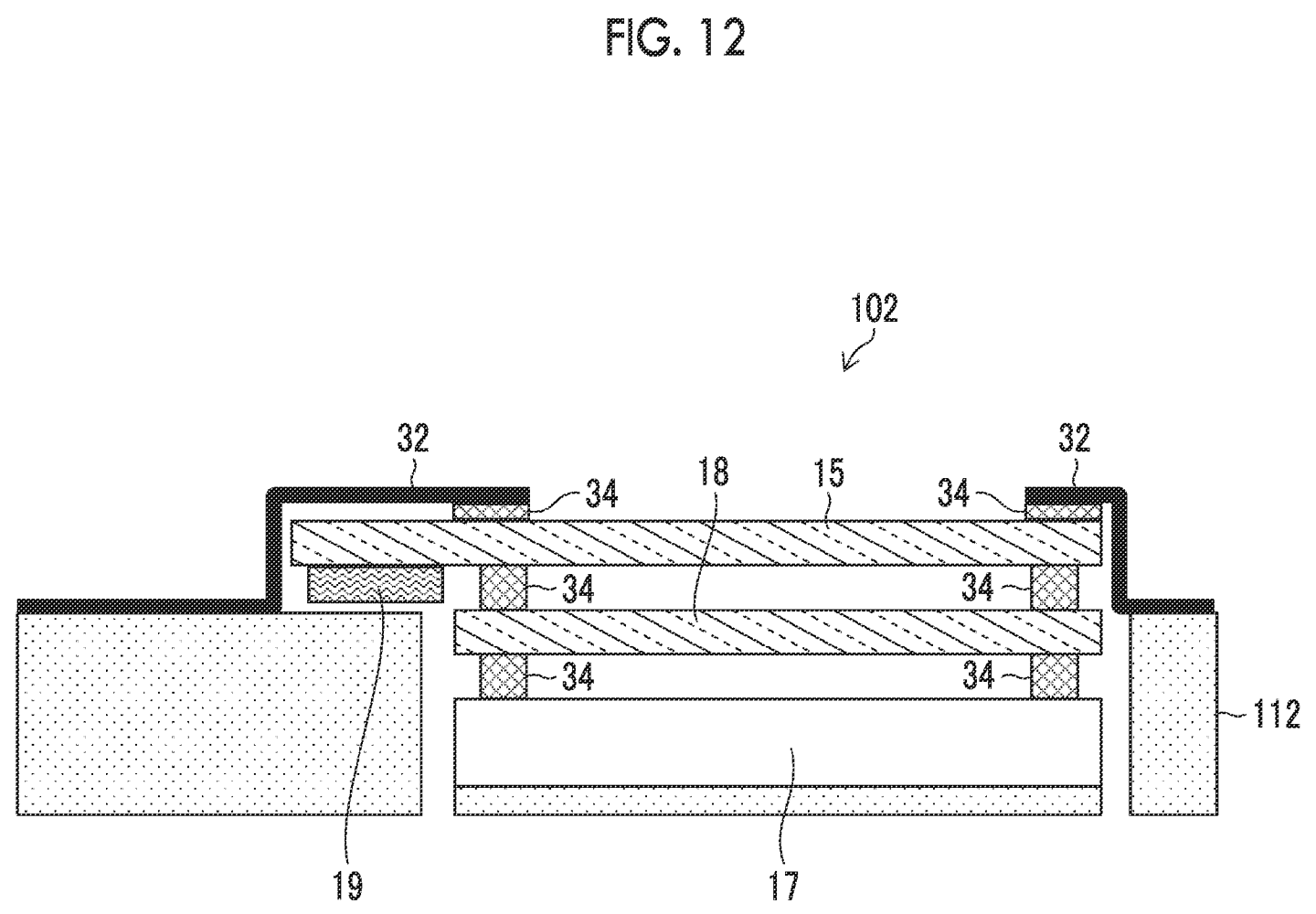

FIG. 12 is a view showing a configuration of an imaging element unit having a DR function in the lens-interchangeable camera. As shown in FIG. 12, an imaging element unit 102 comprises both a dummy glass 15 and the optical member 18, and the piezoelectric element 19 is bonded and fixed to the dummy glass 15 to vibrate the dummy glass 15 to drop the dust. An antireflection coating is vapor-deposited on both surfaces of the dummy glass 15, an IR/UV cut coating (UV: ultraviolet ray) is vapor-deposited on one surface of the optical member 18, and an antireflection coating is vapor-deposited on the other surface thereof.

Figure 13:
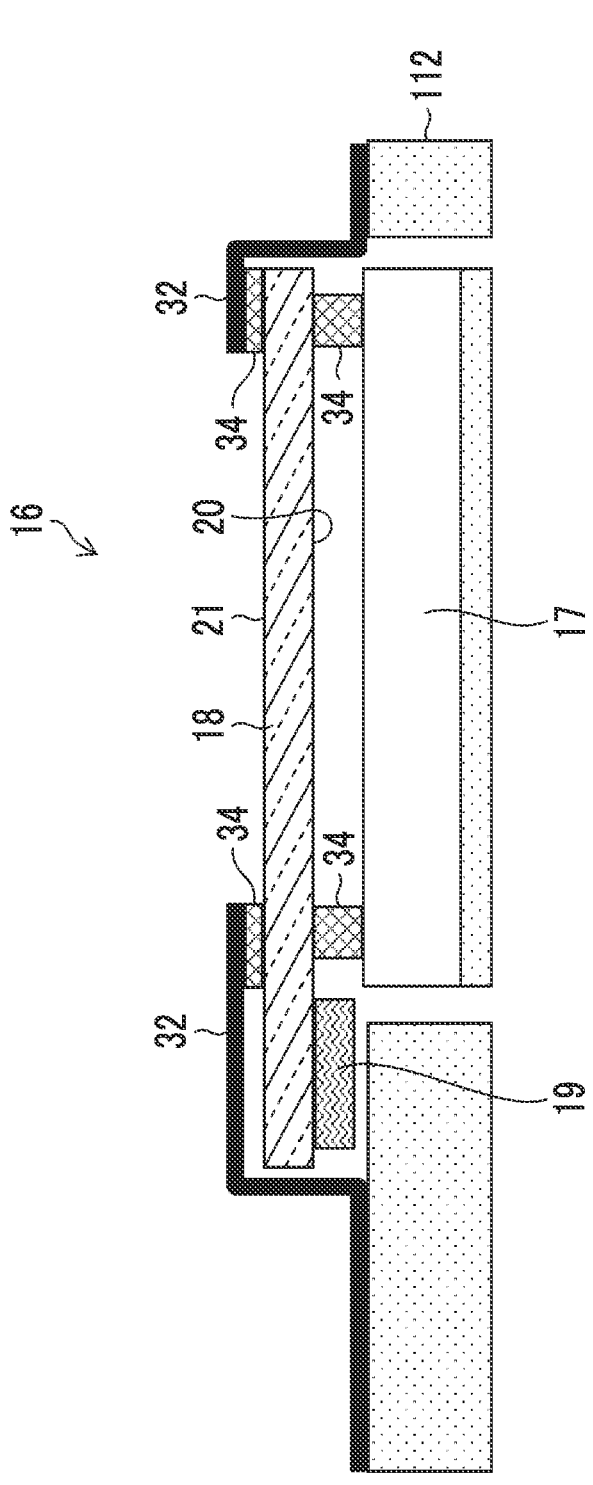
FIG. 13 is a view showing a configuration of the imaging element unit according to the first embodiment.

FIG. 13 is a view showing a configuration of the imaging element unit 16 according to the first embodiment. As shown in FIG. 13, the imaging element unit 16 does not have a dummy glass and has only the optical member 18 (optical member) composed of an IR cut glass. The piezoelectric element 19 is bonded and fixed to the optical member 18, and the optical member 18 is vibrated by the piezoelectric element 19 to drop the dust.

Vapor Deposition of Various Coatings

As in the imaging element unit in the related art, an IR/UV cut coating is vapor-deposited on one surface of the optical member 18, and an antireflection coating is vapor-deposited on the other surface thereof. However, it is necessary to limit a vapor deposition range of the IR/UV cut coating. That is, since it is necessary to transmit UV light through a range where the piezoelectric element 19 is attached, no coating is vapor-deposited on the range of an opposing surface to which the piezoelectric element 19 is attached.

In addition, it is desirable that the IR/UV cut coating is vapor-deposited on a subject-side surface (surface on the +Z side) of the IR cut glass to prevent ghosting. Accordingly, the piezoelectric element 19 is disposed on an imager-side surface (surface on the −Z side) which is opposite to the IR/UV cut coating. Here, it is desirable that the IR cut glass is designed according to the following conditions (1) and (2) in terms of optical design.

Condition (1): The IR cut glass and the imaging element are spaced apart from each other in order to reduce an influence of adhered dust that is reflected in an image.

Condition (2): The IR cut glass and the lens rearmost surface are brought closer in order to increase a degree of freedom of optical design.

It is desirable to dispose the piezoelectric element in a space created by "spaced apart from each other" of the condition (1), and thus, both reduction in size and measures against dust in an image can be achieved. Further, since the piezoelectric element is not present on the subject-side surface, it is possible to contribute to "brought closer" of the condition (2), and thus the design based on the above-described component disposition is the best. For example, in a case where the piezoelectric element is disposed on the subject-side surface of the IR cut glass, it affects the condition (2).

Disposition of Coating and Piezoelectric Element on IR Cut Glass

Figure 14:
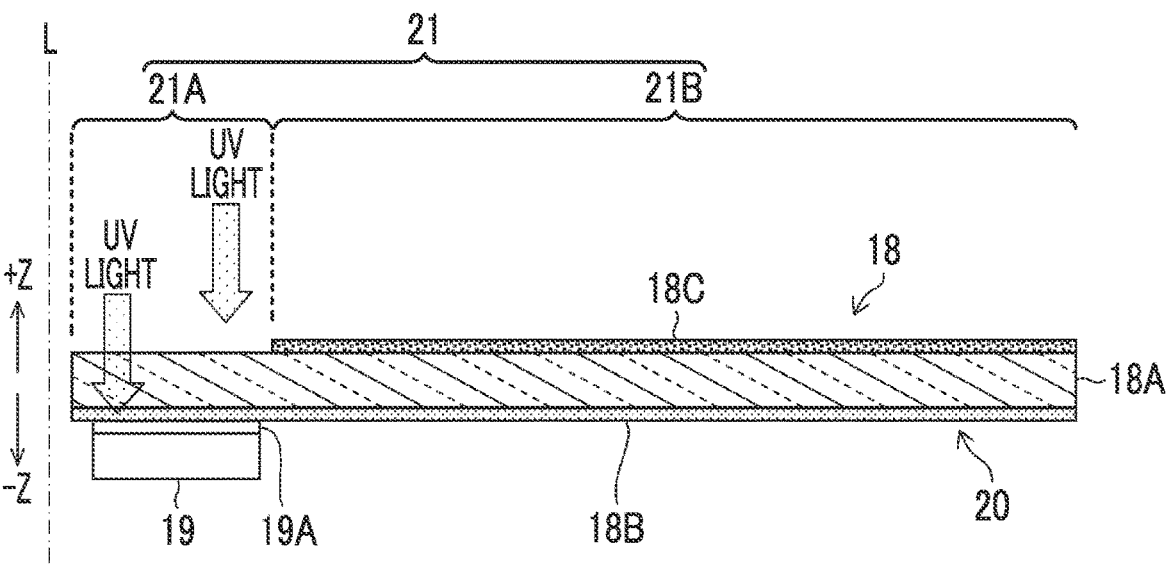
FIG. 14 is a view showing a range where various coatings are provided in the optical member.

FIG. 14 is a view showing disposition of the coating and the piezoelectric element on the optical member 18 (IR cut glass; optical member) according to the first embodiment. In the optical member 18, an antireflection coating film 18B is vapor-deposited on the first surface 20 (first surface) which is a surface on the imaging element 17 side (surface on the −Z side) of an IR cut glass 18A, and an IR/UV cut coating film 18C is vapor-deposited on the second surface 21 (second surface) opposite to the first surface 20. That is, the optical member 18 (IR cut glass 18A) is a glass member that cuts infrared light.

The second surface 21 of the IR cut glass 18A has a first region 21A and a second region 21B. The first region 21A includes a region overlapping with the piezoelectric element 19 (vibration applying device) in a case of being seen through in the direction of the optical axis L, and the second region 21B is a region of the second surface 21 other than the first region 21A (region other than the first region). The first region 21A and the second region 21B differ in a cutting rate of ultraviolet rays (one aspect of surface characteristics). Specifically, the cutting rate of ultraviolet rays in the first region 21A is lower than the cutting rate of ultraviolet rays in the second region 21B. Since the ultraviolet rays are radiated through the first region 21A, it is preferable that the cutting rate of ultraviolet rays in the first region 21A is as low as possible, but the cutting rate may not be zero as long as the adhesive can be cured. In addition, a difference in the cutting rate of ultraviolet rays between the first region 21A and the second region 21B can be realized by coating only the second region 21B with the first region 21A as a mask, removing the coating in the first region 21A of the glass coated on the entire second surface 21 with an organic solvent or an abrasive, or the like.

Fixing of Piezoelectric Element

In the imaging element unit having the above-described configuration, high-accuracy positioning and high adhesion strength are required in assembly in which the piezoelectric element 19 is attached to the optical member 18 (IR cut glass 18A). This is because in a case where a position where the piezoelectric element 19 is attached is shifted, a vibration mode of the glass is changed to affect a dust removal rate. Furthermore, in a case where the entire piezoelectric element 19 is not bonded and fixed to the glass or is partially peeled off due to insufficient adhesion strength, strong vibration does not occur and the dust removal rate decreases. For this reason, it is desirable to fix the piezoelectric element 19 and the optical member 18 by UV bonding (bonding using an ultraviolet curable adhesive) which enables fine adjustment of a bonding position without curing immediately after bonding them, and also enables instant curing and bonding.

In a case where the ultraviolet curable adhesive is used, the piezoelectric element 19 (vibration applying device) can be fixed to the first surface by utilizing a difference in the cutting rate of ultraviolet rays between the first surface 20 and the second surface 21 of the optical member 18. Specifically, the piezoelectric element 19 is fixed to the first surface 20 by irradiating an ultraviolet curable adhesive 19A applied between the first surface 20 and the piezoelectric element 19 with ultraviolet rays through the first region 21A.

Figure 15:
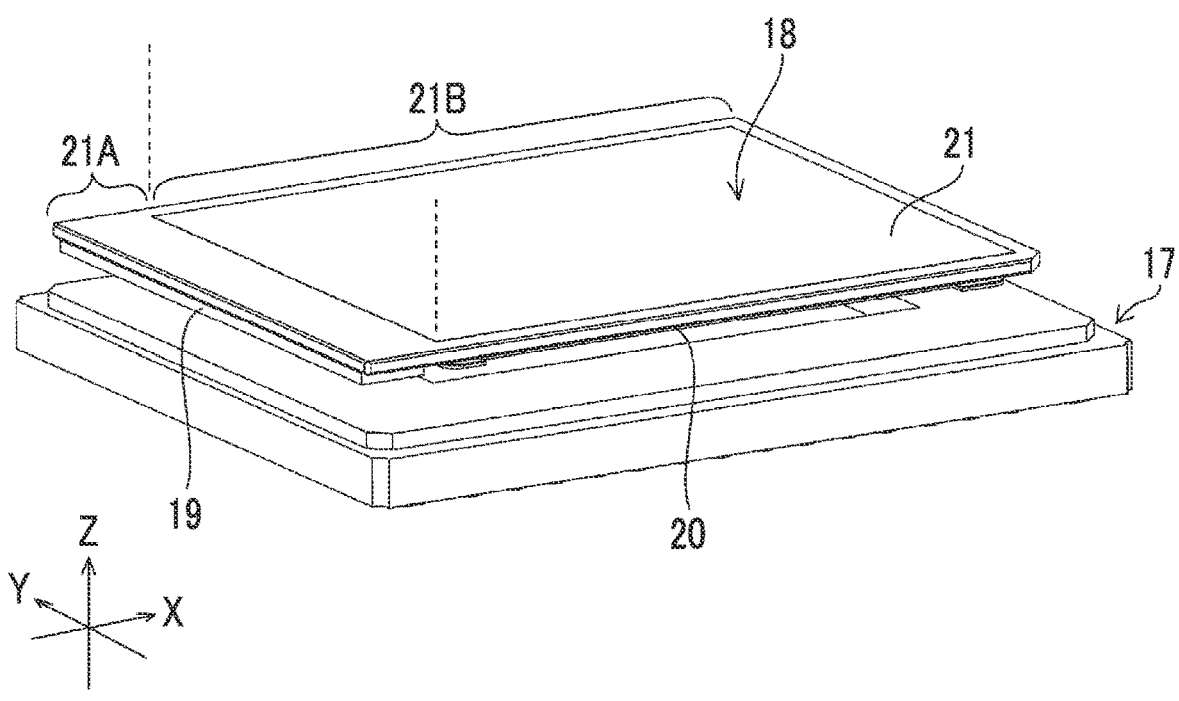
FIG. 15 is a view showing disposition of the optical member and a piezoelectric element in the imaging element unit.
Figure 16A:
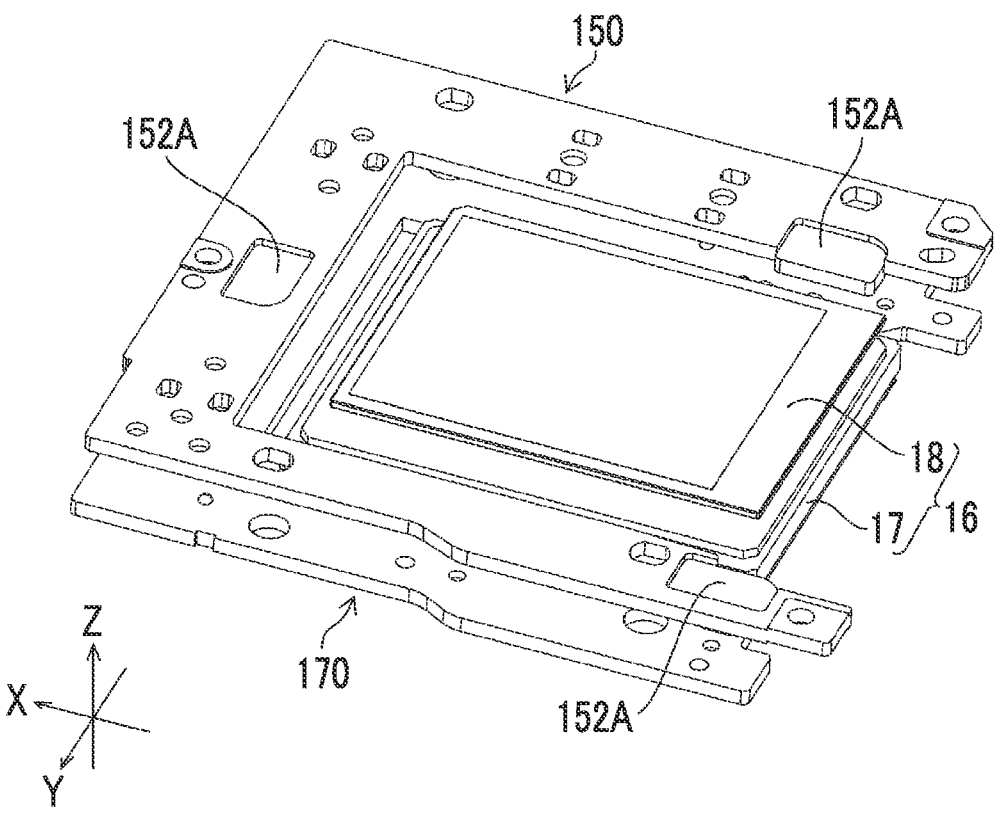
FIGS. 16A and 16B are views showing disposition of the imaging element unit and a yoke in the shake correction device.
Figure 16B:
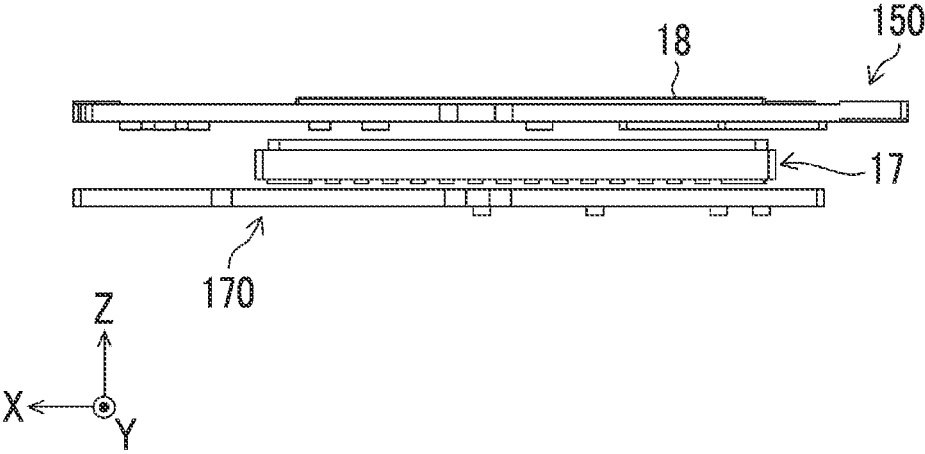

FIG. 15 is a view showing disposition of the imaging element 17, the optical member 18, and the piezoelectric element 19 having such a configuration, and FIGS. 16A and 16B show disposition of the yoke (the drive yoke 150 and the counter yoke 170) of the fixed unit 130 and the imaging element unit 16 (the imaging element 17 and the optical member 18).

Measures Against Dust Using Dustproof Member or the Like

The BIS unit (shake correction device) that drives a large imaging element is likely to be increased in size, and it is not possible to remove all dust in the BIS unit even in a case where the BIS unit is assembled in a clean room and the dust is removed as much as possible. Therefore, the component is assembled in a state in which fine dust adheres to various positions of the component. In addition, since the BIS unit is operated (the movable unit moves in a plane intersecting the optical axis), an appropriate clearance is provided according to a movable amount in order to prevent contact or interference with an exterior component. In a case where the dust moves from the clearance and enters the front of the imaging element, the dust is reflected in the image (for example, see FIG. 20 described in a modification example described below).

Therefore, it is preferable to surround the periphery of the movable unit of the BIS unit with a dustproof sheet or the like to be partitioned into a dustproof region and an exterior component region, thereby limiting an amount of dust remaining in the dustproof region and the movement of the dust into the dustproof region. Although there are many gaps in which dust can move in the dustproof region, routes along which the dust may move and be reflected in the image are limited. Accordingly, the movement of the dust in the dustproof region can also be restricted by placing a dust adsorption member (double-sided tape, viscous grease, or the like; dust adsorption member) on a route where dust becomes a problem and capturing the dust moving toward the imaging element. The dust adsorption member is effective in capturing not only the dust moving toward the imaging element but also the dust dropped from the imaging element by the DR function.

Figure 17:
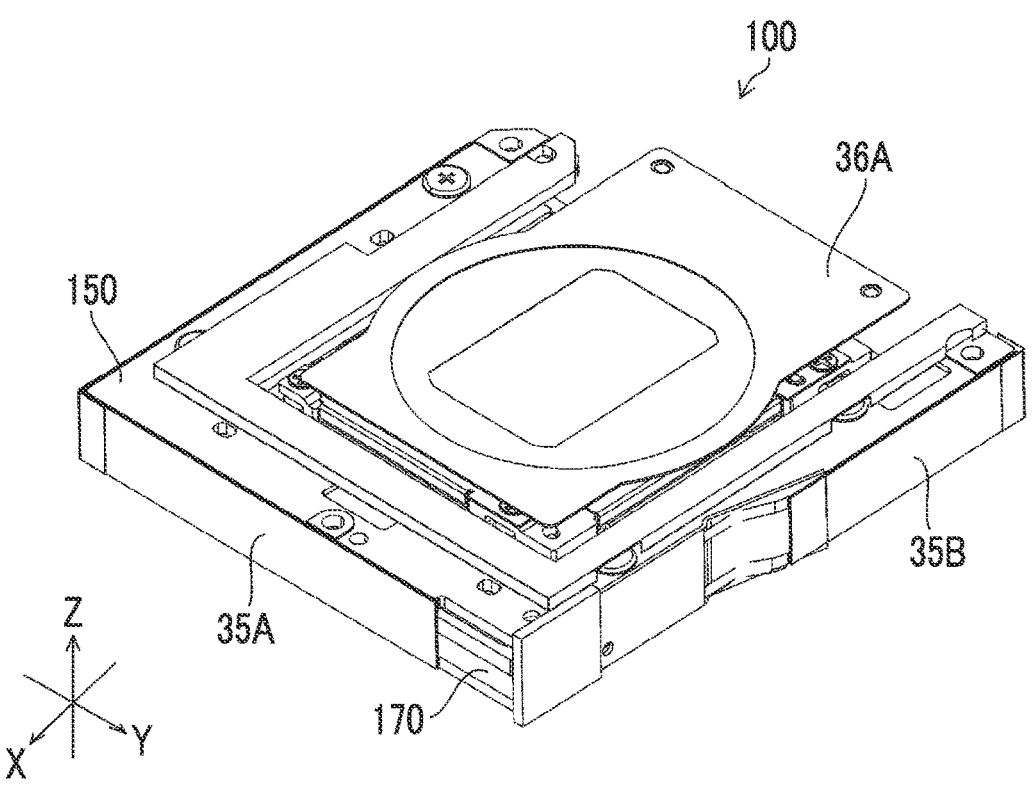
FIG. 17 is a view showing disposition of a dust adsorption member and a dustproof member in the shake correction device.
Figure 18:
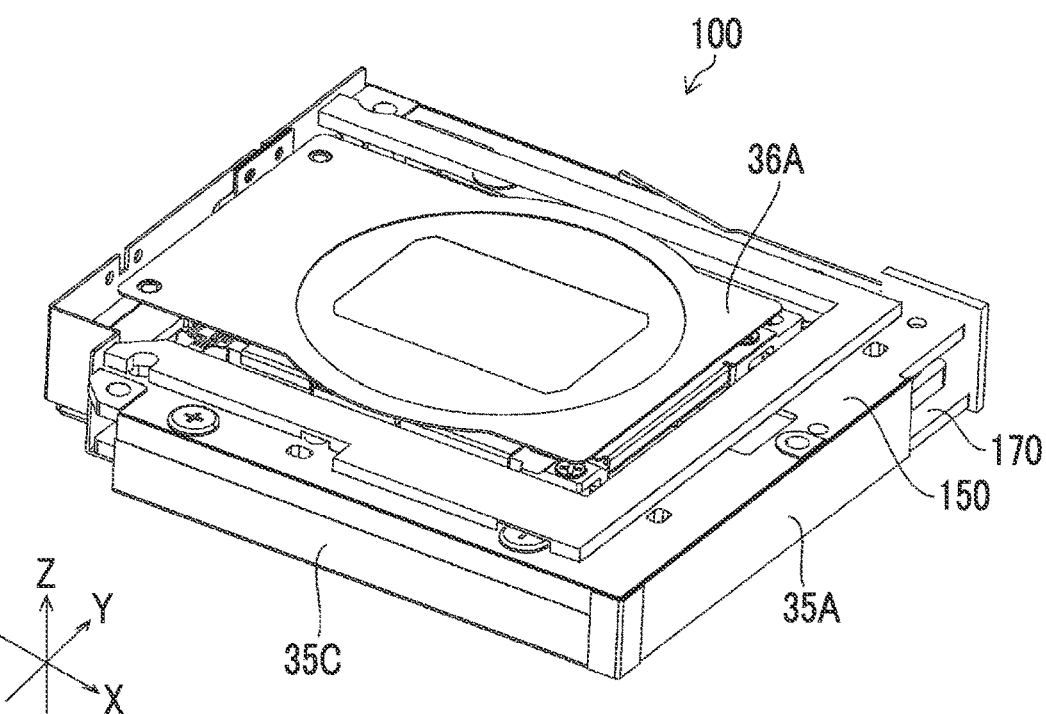
FIG. 18 is another view showing the disposition of the dust adsorption member and the dustproof member in the shake correction device.

FIGS. 17 and 18 are views showing disposition of the dustproof member and the dust adsorption member. As shown in these drawings, a part of a gap in a side surface portion (XY plane direction) between the drive yoke 150 (first yoke) and the counter yoke 170 (second yoke) is shielded by dustproof members 35A, 35B, 35C (first dustproof member). It is assumed that the shielding is made for "at least a part" of the gap. From the viewpoint of dustproofing, it is preferable to shield as many portions of the gaps as possible, if possible, the entirety of the gap, but it is acceptable to secure a space for drawing out other members, wirings, or the like. However, it is preferable that the space secured for such a purpose is also shielded as much as possible with other shielding members or the like.

Further, a dust adsorption member 36A (dust adsorption member) is provided on the subject side (+Z side) of the imaging element 17. As described above, a double-sided tape, viscous grease, or the like can be used as the dust adsorption member 36A.

Figure 19:
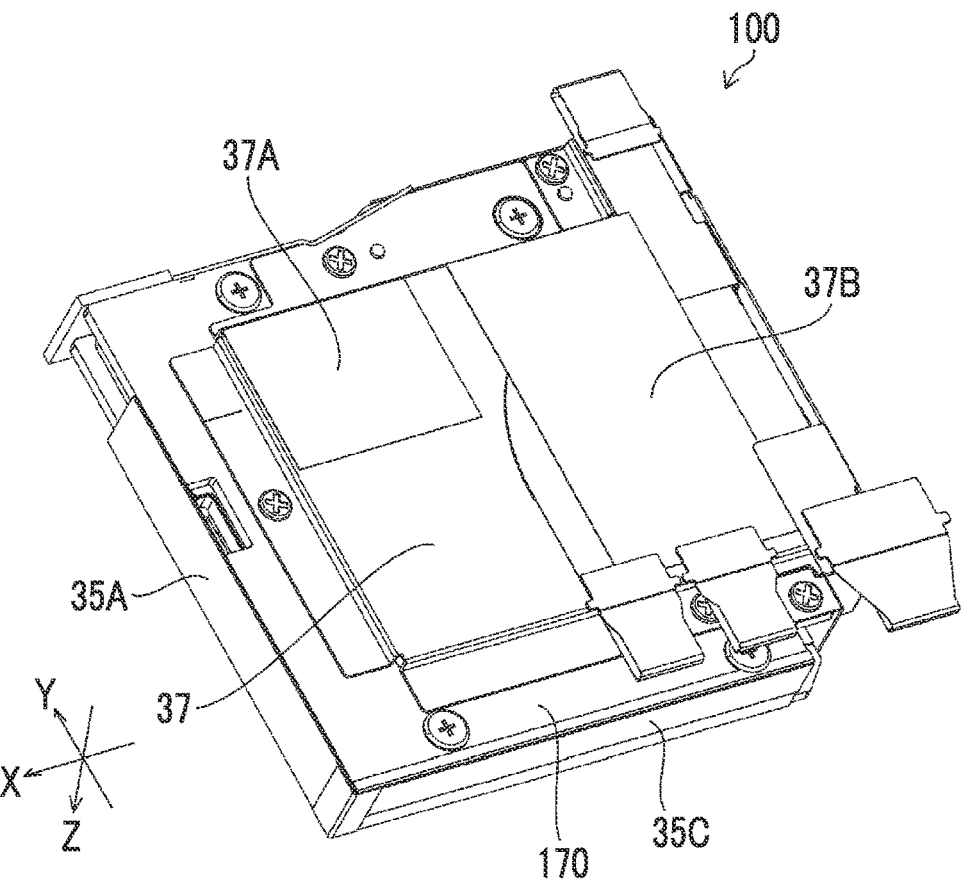
FIG. 19 is a view showing the disposition of the dustproof member in the shake correction device.

Further, in the shake correction device 100, at least a part of a gap between the counter yoke 170 (second yoke) and the movable unit 110 in the direction of the optical axis L is shielded by the dustproof member (second dustproof member). Specifically, as shown in FIG. 19, the gap between the counter yoke 170 and the movable unit 110 is shielded by a dustproof member 37 (second dustproof member) at a rear end portion (−Z side) of the shake correction device 100. The meaning of "at least a part" is the same as described above for the first dustproof member. In an aspect shown in FIG. 19, an opening for drawing out a wiring or the like in the dustproof member 37 is shielded by tape members 37A and 37B.

Effect of First Embodiment

As described above, according to the imaging element unit 16, the shake correction device 100, and the imaging apparatus 10 according to the first embodiment, restrictions on the disposition of components and the optical design in the imaging apparatus 10 are reduced, and the imaging element unit 16 and the shake correction device 100 can be reduced in size and made with high accuracy, so that it is possible to design a compact and high-performance lens in the lens-integrated camera. Furthermore, it is possible to effectively perform dustproofing and dust removal, and to suppress the dust from being reflected in the image.

Modification Example of First Embodiment

In the above-described first embodiment, the movable unit 110 is biased to the drive yoke 150 (first yoke) on the subject side (+Z side). However, in the present invention, the movable unit may be biased to an opposite side thereof (second yoke on the −Z side). Hereinafter, modification examples of configurations of the shake correction device and the imaging apparatus will be described.

Figure 20:
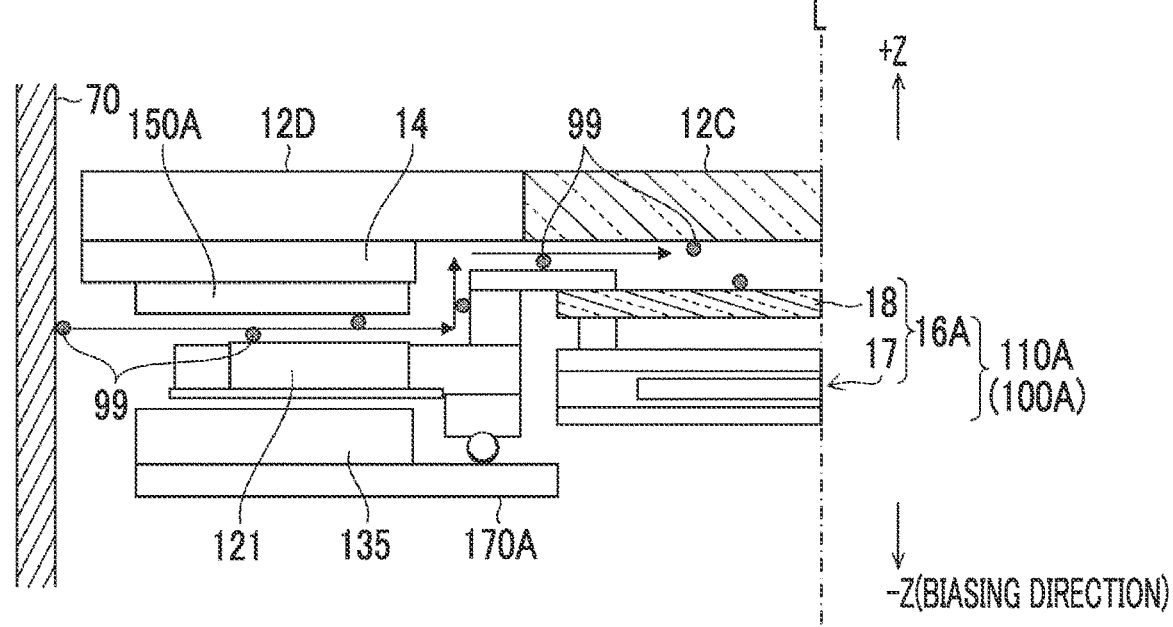
FIG. 20 is a view showing a modification example of the shake correction device (a state without measures against dust).

FIG. 20 is a view for explaining a modification example of the first embodiment. As shown in FIG. 20, in the modification example, a movable unit 110A of a shake correction device 100A is biased to a counter yoke 170A on the −Z side. The movable unit 110A comprises an imaging element unit 16A. The example shown in FIG. 20 shows a state in which measures against dust are not taken. In this state, dust 99 that has entered through a gap between an exterior 70 of the imaging apparatus and the movable unit 110A adheres to the optical member 18 and the like.

Figure 21:
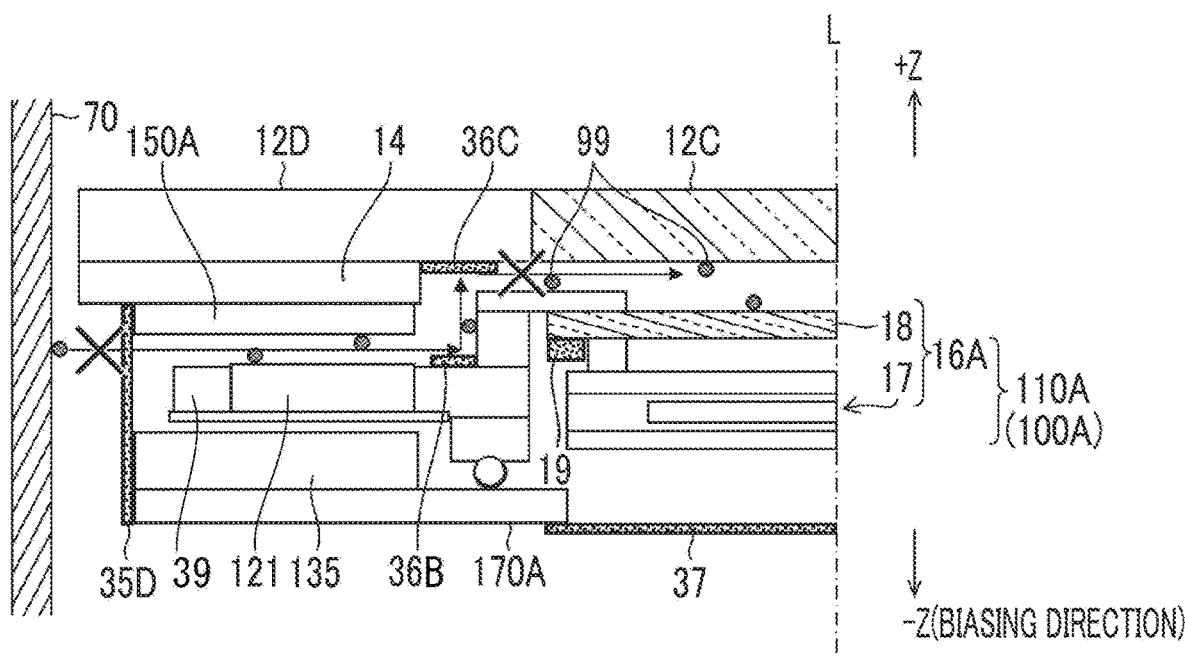
FIG. 21 is a view showing a modification example of the shake correction device (a state with measures against dust).

On the other hand, FIG. 21 shows a state in which measures against dust are taken, and at least a part of a gap in a side surface portion between a drive yoke 150A (first yoke) and the counter yoke 170A (second yoke) is shielded by a dustproof member 35D (first dustproof member) and at least a part of a gap between the counter yoke 170A (second yoke) and the movable unit in the direction of the optical axis L is shielded by the dustproof member 37 (second dustproof member). Further, a magnet 135 is disposed on the +Z side of the counter yoke 170A.

Further, the shake correction device 100A is in contact with a lens frame 12D (lens frame), which holds the rearmost lens 12C (lens), via a buffer member 14 (buffer member). The lens frame 12D and the shake correction device 100A comprise dust adsorption members 36B and 36C (dust adsorption member) at positions between the coil member 121 (coil member) and the imaging element 17 (imaging element) in the XY plane direction (direction intersecting the optical axis L), respectively. Further, the movable unit 110A of the shake correction device 100A comprises a degreasing portion 39 (degreasing portion) on a side opposite to the imaging element 17 with respect to the coil member 121 (side away from the optical axis L with respect to the coil member 121; left side of FIG. 21). Although FIG. 21 shows only one side of the shake correction device 100A, it is preferable that a part not shown in the drawing also comprises a dust adsorption member or a degreasing portion.

The points that the piezoelectric element 19 is provided on the first surface 20 of the optical member 18 and that the piezoelectric element 19 is fixed to the first surface 20 by using a difference in surface characteristics between the first surface 20 and the second surface 21 are the same as described above for the first embodiment.

Even in the imaging element unit, the shake correction device, and the imaging apparatus according to such modification example, effects of reduction in size, high accuracy, dustproofing, dust removal, and the like can be exhibited as in the above-described first embodiment.

Application of Present Invention to Device Other than Digital Camera

In the first embodiment and the modification example, the present invention has been described by using the lens-integrated digital camera equipped with the BIS (shake correction device) as an example, but the present invention is not specialized for the digital camera. For example, the present invention can be applied to other imaging apparatuses on which the BIS can be mounted, such as a lens-integrated surveillance camera and drone camera.

Second Embodiment

Figure 22:
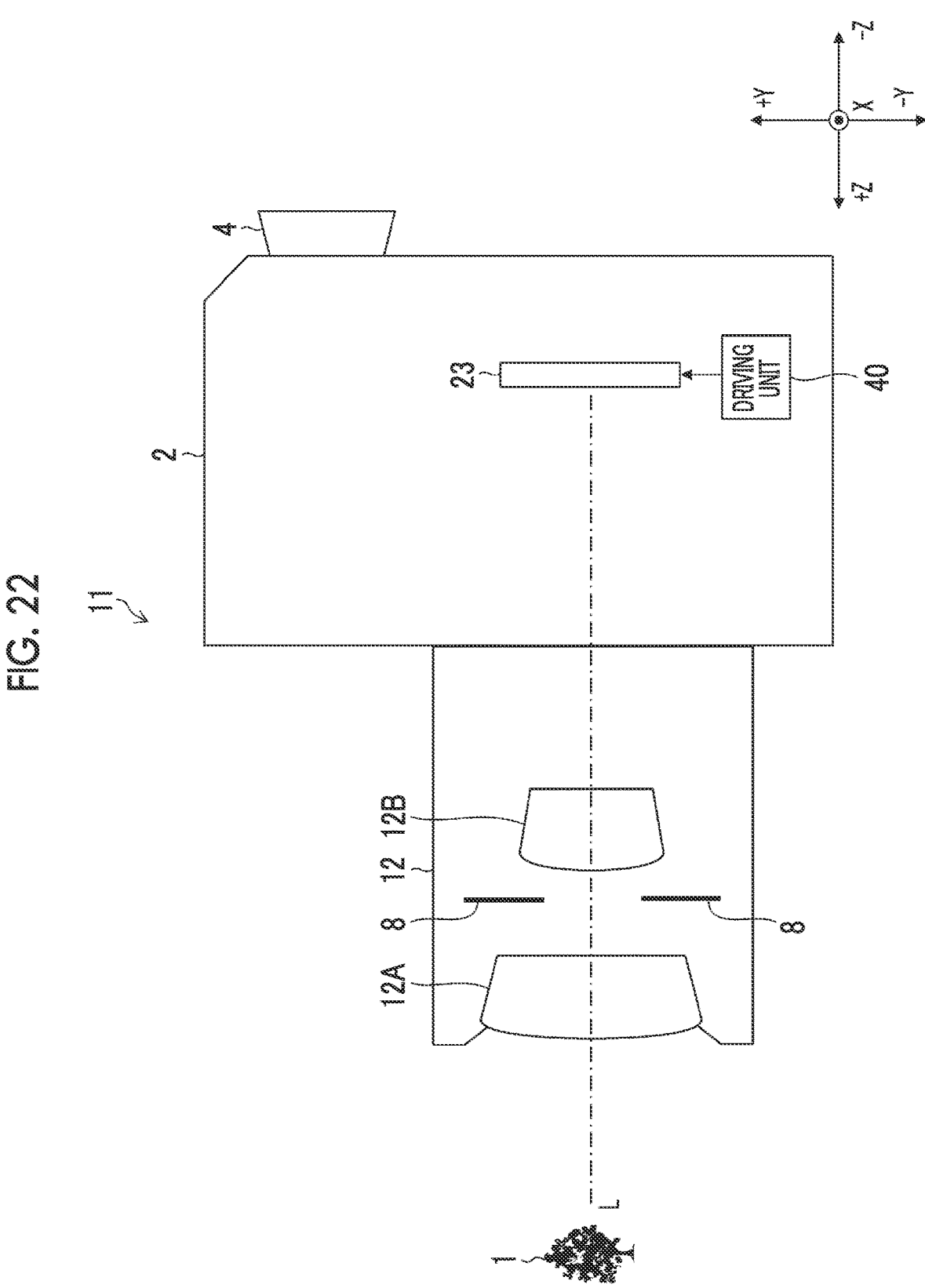
FIG. 22 is a view showing a schematic configuration of an imaging apparatus according to a second embodiment.
Figure 23:
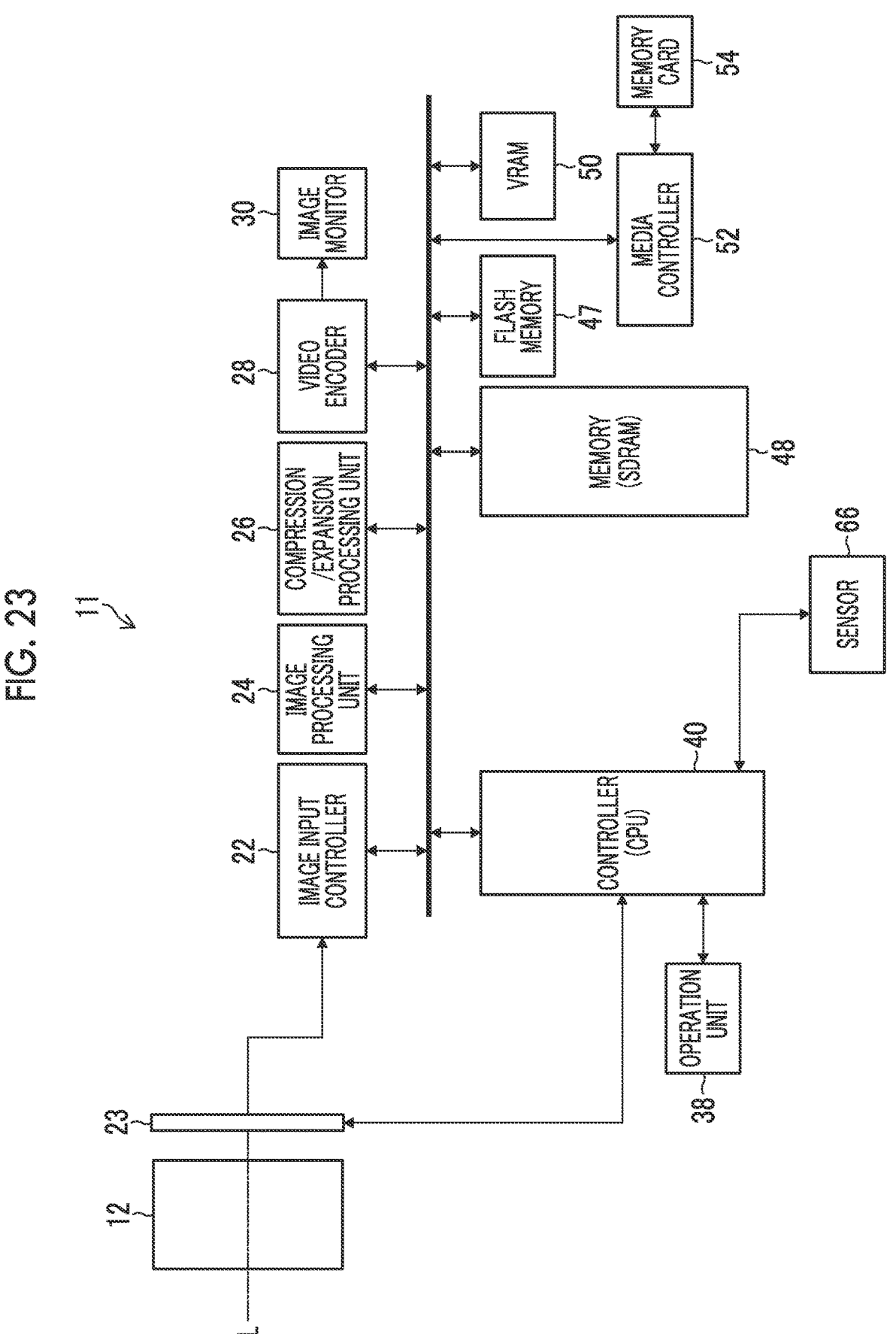
FIG. 23 is a block diagram showing an internal configuration of the imaging apparatus according to the second embodiment.

In the first embodiment and the modification example described above, a case where the present invention is applied to the imaging apparatus including the shake correction device has been described. However, the present invention can also be applied to an imaging apparatus that does not include the shake correction device. FIG. 22 is a view showing a schematic configuration of an imaging apparatus 11 according to the second embodiment, and FIG. 23 is a view showing an internal configuration of the imaging apparatus 11. The imaging apparatus 11 does not have a shake correction device, and the controller 40 controls an imaging element unit 23 (the optical member 18 and the piezoelectric element 19; see FIG. 24) to remove dust. Since the other configurations of the imaging apparatus 11 are the same as those of the first embodiment (see FIGS. 1, 2, and the like), the same constituent elements are designated by the same references, and detailed description thereof will not be repeated.

Figure 24:
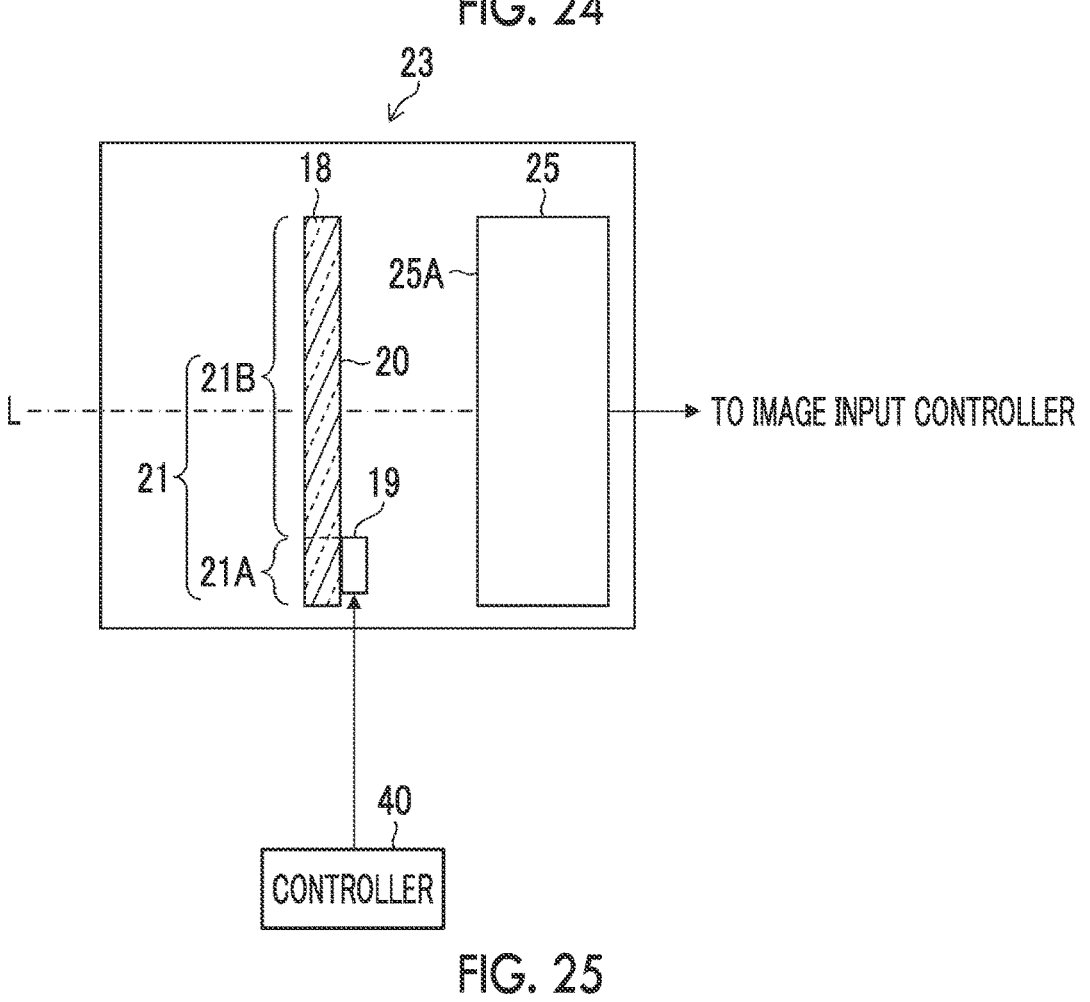
FIG. 24 is a view showing a state in which an imaging element unit is controlled.

FIG. 24 is a view showing a configuration of the imaging element unit 23 according to the second embodiment. As shown in FIG. 24, the imaging element unit 23 includes an imaging element 25 (an imaging surface is an imaging surface 25A), and the optical member 18 (optical member) is disposed on a front surface (+Z side; subject side) of the imaging element 25.

The optical member 18 is an IR cut glass and is coated with an antireflection coating film and an IR/UV cut coating film as in the first embodiment. Further, the piezoelectric element 19 is disposed on the first surface 20 of the optical member 18, and the controller 40 controls the piezoelectric element 19 to vibrate the piezoelectric element 19, so that the dust removal can be performed. In addition, the second surface 21 of the optical member 18 has the first region 21A and the second region 21B, and the piezoelectric element 19 can be fixed by curing the ultraviolet curable adhesive (not shown in FIG. 24; see FIG. 14) by irradiation with ultraviolet rays through the first region 21A by utilizing a difference in the surface characteristic (cutting rate of ultraviolet rays). These points are the same as those described above for the first embodiment, and detailed description thereof will not be repeated.

Figure 25:
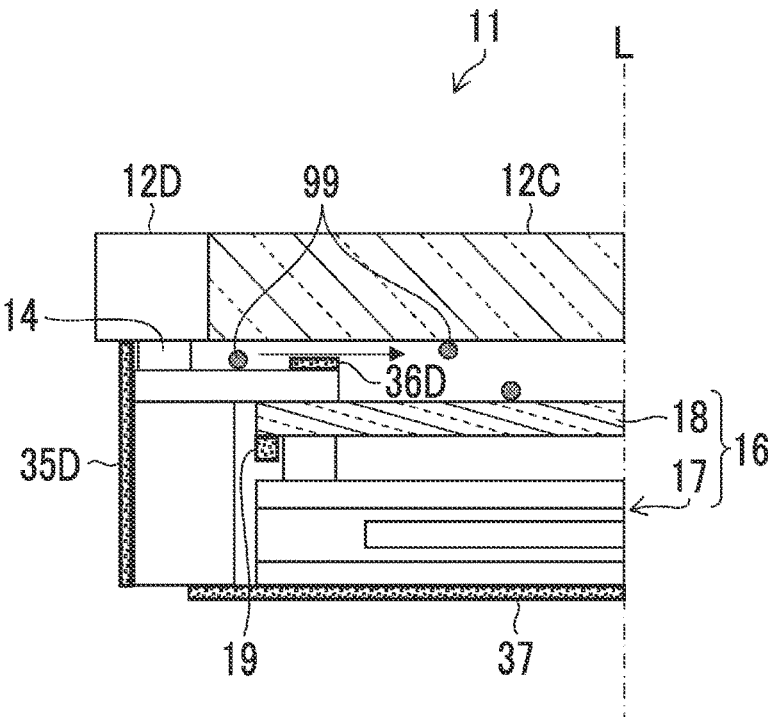
FIG. 25 is a schematic view showing the imaging element unit according to the second embodiment.

FIG. 25 is a view showing a portion of the imaging element unit 23 of the imaging apparatus 11. The imaging apparatus 11 includes the dustproof member 35D (dustproof member) that shields a side surface portion of the imaging element unit 23 and the dustproof member 37 (dustproof member) that shields a bottom surface portion, as in the first embodiment. Further, the imaging apparatus 11 comprises a dust adsorption member 36D. It is preferable that the imaging apparatus 11 includes a degreasing portion as in the first embodiment.

Even in the imaging element unit and the imaging apparatus having such configurations, effects such as reduction in size, high accuracy, dustproofing, and the like can be exhibited in the same manner as described above for the first embodiment and the modification example. The imaging element unit and the imaging apparatus according to the second embodiment can be applied to other imaging apparatuses such as a camera mounted on a smartphone, a tablet terminal, or a game device, a surveillance camera, a drone camera, and the like, in addition to a general digital camera.

EXPLANATION OF REFERENCES

1: subject
2: imaging apparatus main body
4: eyepiece portion
10: imaging apparatus
11: imaging apparatus
12: lens device
12A: lens group
12B: lens group
12C: rearmost lens
12D: lens frame
13: mount surface
14: buffer member
15: dummy glass
16: imaging element unit
16A: imaging element unit
17: imaging element
17A: imaging surface
18: optical member
18A: IR cut glass
18B: antireflection coating film
18C: IR/UV cut coating film
19: piezoelectric element
19A: ultraviolet curable adhesive
20: first surface
21: second surface
21A: first region
21B: second region
22: image input controller
23: imaging element unit
24: image processing unit
25: imaging element

25A: imaging surface
26: compression/expansion processing unit
28: video encoder
30: image monitor
35A: dustproof member
35B: dustproof member
35C: dustproof member
35D: dustproof member
36A: dust adsorption member
36B: dust adsorption member
36C: dust adsorption member
36D: dust adsorption member
37: dustproof member
37A: tape member
37B: tape member
38: operation unit
39: degreasing portion
40: controller
47: flash memory
48: memory
52: media controller
54: memory card
58: driving unit
66: sensor
70: exterior
99: dust
100: shake correction device
100A: shake correction device
102: imaging element unit
110: movable unit
110A: movable unit
112: holding frame
112A: opening
114A: opening
114B: opening
114C: opening
116: ball holding portion
118: ball receiving member
118A: second ball receiving surface
120: coil
121: coil member
122: coil
124: coil
130: fixed unit
134: ball
136A: magnet
136B: magnet
138A: magnet
138B: magnet
140A: magnet
140B: magnet
150: drive yoke
150A: drive yoke
152: first ball receiving surface
152A: recessed portion
154: mounting surface
162: magnetic spring
164: magnetic spring
166: magnetic spring
170: counter yoke
170A: counter yoke

What is claimed is:
1. An imaging element unit comprising:
an imaging element;
an optical member that is disposed on an imaging surface
    side of the imaging element; and

19 a vibration applying device that is disposed on a first surface of the optical member, wherein a second surface of the optical member opposite to the first surface has a first region including a region overlapping with the vibration applying device in a case of being seen through in an optical axis direction of the imaging element, and a second region that is a region other than the first region, and the first region and the second region have different surface characteristics, wherein the surface characteristic is a cutting rate of ultraviolet rays.

2. The imaging element unit according to claim 1, wherein the vibration applying device is fixed to the first surface by utilizing a difference in the surface characteristic.

3. The imaging element unit according to claim 1, wherein the vibration applying device is fixed to the first surface by irradiating an ultraviolet curable adhesive applied between the first surface and the vibration applying device with ultraviolet rays through the first region.

4. The imaging element unit according to claim 1, wherein the cutting rate in the first region is lower than the cutting rate in the second region.

5. The imaging element unit according to claim 1, wherein the optical member is a glass member that cuts infrared light.

6. The imaging element unit according to claim 1, wherein the optical member is vibrated by the vibration applying device so that dust adhering to the optical member is removed.

7. The imaging element unit according to claim 1, wherein the vibration applying device is a piezoelectric element.

8. The imaging element unit according to claim 1, wherein the first surface is a surface of the optical member on an imaging element side.

9. A shake correction device comprising:

a fixed unit that includes a magnet member and a yoke member; and a movable unit that includes the imaging element unit according to claim 1 and a coil member,

wherein an image shake is corrected by moving the movable unit in a plane intersecting an optical axis of the imaging element.

10. The shake correction device according to claim 9, wherein the yoke member is composed of a first yoke to which the magnet member is provided and a second yoke that is disposed to be spaced apart from the first yoke.

11. The shake correction device according to claim 10, wherein at least a part of a gap in a side surface portion between the first yoke and the second yoke is shielded by a first dustproof member.

12. The shake correction device according to claim 10, wherein at least a part of a gap between the second yoke and the movable unit in a direction of the optical axis of the imaging element is shielded by a second dustproof member.

13. The shake correction device according to claim 9, wherein the movable unit includes a degreasing portion provided on a side opposite to the imaging element with respect to the coil member.

14. The shake correction device according to claim 9, wherein the movable unit includes a dust adsorption member at a portion between the coil member and the imaging element.

15. An imaging apparatus comprising:

the shake correction device according to claim 9; and an optical system that forms an optical image of a subject on the imaging element.

16. The imaging apparatus according to claim 15, wherein other optical components are not interposed in a direction of the optical axis between the optical member and a rearmost lens which is a lens located closest to an imaging surface of the imaging element among lenses constituting the optical system.

17. The imaging apparatus according to claim 15, wherein the imaging apparatus is a lens-integrated imaging apparatus.

18. The imaging apparatus according to claim 15, wherein the shake correction device is in contact with a lens frame holding a lens via a buffer member, and the lens frame includes a dust adsorption member at a portion between the coil member and the imaging element.

* * * * *